(12) United States Patent
Sadri et al.

(10) Patent No.: US 11,501,236 B2
(45) Date of Patent: Nov. 15, 2022

(54) SYSTEMS AND METHODS FOR ANALYZING A PHYSICAL INFRASTRUCTURE

(71) Applicants: Arif Mohaimin Sadri, Miami, FL (US); Md Ashraf Ahmed, Miami, FL (US)

(72) Inventors: Arif Mohaimin Sadri, Miami, FL (US); Md Ashraf Ahmed, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/217,547

(22) Filed: Mar. 30, 2021

(65) Prior Publication Data

US 2022/0318701 A1 Oct. 6, 2022

(51) Int. Cl.
*G06Q 10/06* (2012.01)
(52) U.S. Cl.
CPC ..... *G06Q 10/0637* (2013.01); *G06Q 10/0635* (2013.01)
(58) Field of Classification Search
None
See application file for complete search history.

(56) References Cited

U.S. PATENT DOCUMENTS

| 2013/0216089 | A1* | 8/2013 | Chen | G06T 7/0002 |
| | | | | 382/100 |
| 2013/0269125 | A1* | 10/2013 | Grace | E01D 19/125 |
| | | | | 14/73 |
| 2017/0122909 | A1* | 5/2017 | Goroshevskiy | G01N 33/20 |

FOREIGN PATENT DOCUMENTS

CN 107247826 A * 10/2017

OTHER PUBLICATIONS

Kiamarsi, Fariba, and Gamaleldin Mahmoud Saeed Mohamed. Critical success factors for efficient bridge construction. MS thesis. 2015. (Year: 2015).*
Ardeshir, Abdollah, et al. "Selection of a bridge construction site using fuzzy analytical hierarchy process in geographic information system." Arabian Journal for Science and Engineering 39.6 (2014): 4405-4420. (Year: 2014).*

* cited by examiner

*Primary Examiner* — Thomas L Mansfield
(74) *Attorney, Agent, or Firm* — Saliwanchik, Lloyd & Eisenschenk

(57) ABSTRACT

Systems, methods, and frameworks are provided for analyzing topological credentials of a physical network or infrastructure using network science principles and identifying the most influential physical locations within the physical network. The vulnerability and resilience of the physical network can be assessed based on network science principles and/or graph theory to identify the most central physical components to assist with decision making for operation, maintenance, repair, and/or construction within the physical network.

11 Claims, 21 Drawing Sheets

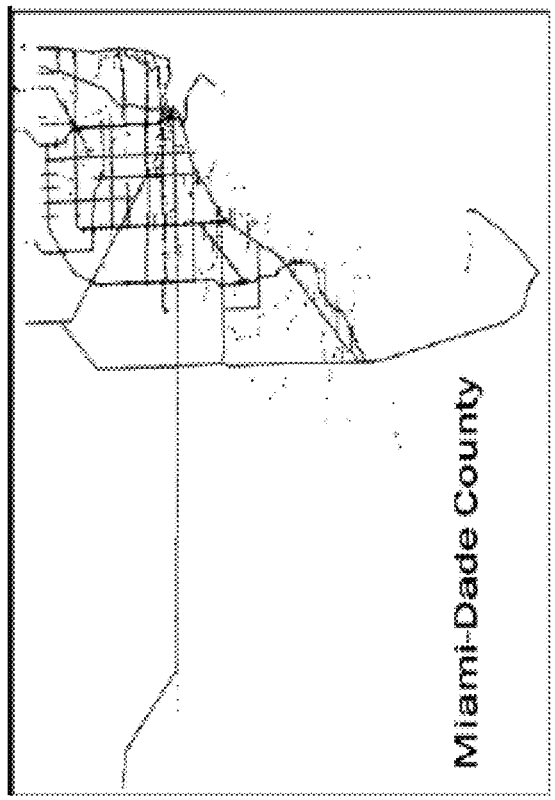
FIG. 8(b) Miami-Dade County
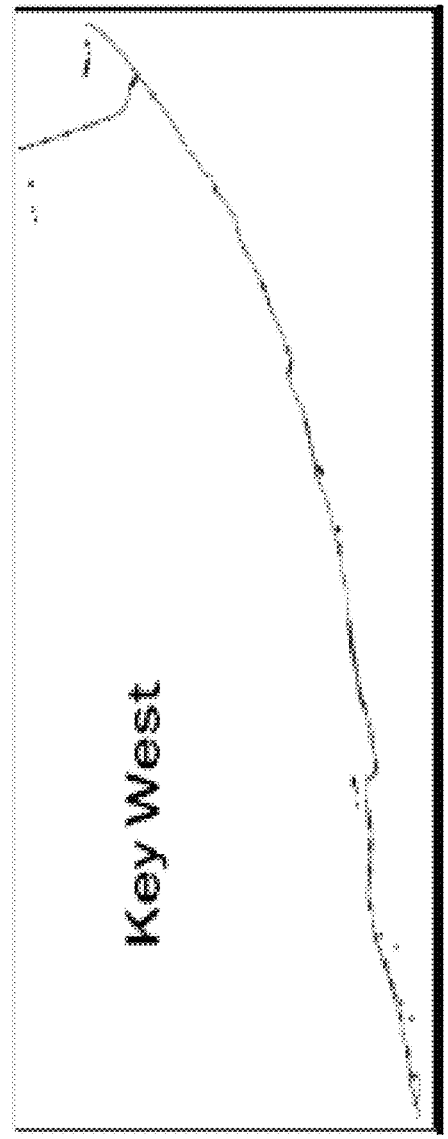
FIG. 8(c) Key West

| Bridge Rank | Node Long. | Node Lat. | Closeness Centrality | Roads | Bridges |
|---|---|---|---|---|---|
| 1 | -81.228329 | 24.6823346 | 0.118102797 | Overseas Hwy | Overseas Hwy |
| 2 | -81.1246718 | 24.7068776 | 0.113471314 | Overseas Hwy | Overseas Hwy |
| 3 | -81.6725094 | 24.5901406 | 0.107832988 | Overseas Hwy | Overseas Hwy |
| 4 | -80.958729 | 24.756647 | 0.100353243 | Overseas Hwy | Overseas Hwy |
| 5 | -81.6743332 | 24.589813 | 0.099206349 | Overseas Hwy | Overseas Hwy |
| 6 | -81.047453 | 24.725695 | 0.099206349 | Overseas Hwy | Overseas Hwy |
| 7 | -80.9235268 | 24.777144 | 0.092840166 | Overseas Hwy | Overseas Hwy |
| 8 | -81.7427334 | 24.5729766 | 0.091857731 | Overseas Hwy | Overseas Hwy |
| 9 | -81.047491 | 24.725827 | 0.089031339 | Overseas Hwy | Overseas Hwy |
| 10 | -81.752044 | 24.5699624 | 0.088127468 | Overseas Hwy | Overseas Hwy |
| 11 | -80.91951 | 24.7785898 | 0.085522715 | Overseas Hwy | Overseas Hwy |
| 12 | -81.7432766 | 24.5728014 | 0.085522715 | Overseas Hwy | Overseas Hwy |
| 13 | -81.7434696 | 24.5726258 | 0.082280147 | Overseas Hwy | Overseas Hwy |
| 14 | -80.640942 | 24.9131724 | 0.078557064 | Overseas Hwy | Overseas Hwy |
| 15 | -81.742596 | 24.572912 | 0.077160494 | Overseas Hwy | Overseas Hwy |
| 16 | -81.6736356 | 24.5897558 | 0.072640632 | Overseas Hwy | Overseas Hwy |
| 17 | -81.6733966 | 24.5897918 | 0.068620993 | Overseas Hwy | Overseas Hwy |
| 18 | -80.374722 | 25.17707516 | 0.037037037 | Overseas Hwy | Overseas Hwy |
| 19 | -80.3742914 | 25.17166 | 0.027777778 | Overseas Hwy | Overseas Hwy |

FIG. 10

| Bridge Rank | Start Long. | Start Lat. | End Long. | End Lat. | Edge Betweenness Centrality | Roads | Bridges |
|---|---|---|---|---|---|---|---|
| 1 | -81.6734 | 24.58979 | -81.2283 | 24.68233 | 0.217717718 | Ovrs Hwy | Ovrs Hwy |
| 2 | -81.6736 | 24.58976 | -81.6734 | 24.58979 | 0.216216216 | Ovrs Hwy | Ovrs Hwy |
| 3 | -81.7426 | 24.57291 | -81.6736 | 24.58976 | 0.214714715 | Ovrs Hwy | Ovrs Hwy |
| 4 | -81.7435 | 24.57263 | -81.7426 | 24.57291 | 0.213213213 | Ovrs Hwy | Ovrs Hwy |
| 5 | -81.752 | 24.56996 | -81.7435 | 24.57263 | 0.211711712 | Ovrs Hwy | Ovrs Hwy |
| 6 | -81.7433 | 24.5728 | -81.7522 | 24.57011 | 0.201201201 | Ovrs Hwy | Ovrs Hwy |
| 7 | -81.7427 | 24.57298 | -81.7433 | 24.5728 | 0.1996997 | Ovrs Hwy | Ovrs Hwy |
| 8 | -81.6743 | 24.58981 | -81.7427 | 24.57298 | 0.198198198 | Ovrs Hwy | Ovrs Hwy |
| 9 | -81.6725 | 24.59014 | -81.6743 | 24.58981 | 0.196696697 | Ovrs Hwy | Ovrs Hwy |
| 10 | -81.2283 | 24.68233 | -81.6725 | 24.59014 | 0.195195195 | Ovrs Hwy | Ovrs Hwy |
| 11 | -81.0475 | 24.7257 | -80.9587 | 24.73665 | 0.154654655 | Ovrs Hwy | Ovrs Hwy |
| 12 | -81.1247 | 24.70688 | -81.0475 | 24.7257 | 0.153153153 | Ovrs Hwy | Ovrs Hwy |
| 13 | -81.2283 | 24.68233 | -81.1247 | 24.70688 | 0.144144144 | Ovrs Hwy | Ovrs Hwy |
| 14 | -81.0475 | 24.72583 | -81.1247 | 24.70688 | 0.127627628 | Ovrs Hwy | Ovrs Hwy |
| 15 | -80.9587 | 24.73665 | -81.0475 | 24.72583 | 0.126126126 | Ovrs Hwy | Ovrs Hwy |
| 16 | -80.9587 | 24.73665 | -80.9235 | 24.72583 | 0.1201201 | Ovrs Hwy | Ovrs Hwy |
| 17 | -81.1247 | 24.70688 | -81.2283 | 24.68233 | 0.1201201 | Ovrs Hwy | Ovrs Hwy |
| 18 | -80.9235 | 24.77714 | -80.9587 | 24.77859 | 0.110110110 | Ovrs Hwy | Ovrs Hwy |
| 19 | -80.9195 | 24.77859 | -80.9195 | 24.91317 | 0.099099099 | Ovrs Hwy | Ovrs Hwy |
| 20 | -80.6409 | 24.91317 | -80.3748 | 25.17029 | 0.097597598 | Ovrs Hwy | Ovrs Hwy |
| 21 | -80.9235 | 24.75665 | -80.9587 | 24.73665 | 0.096096096 | Ovrs Hwy | Ovrs Hwy |
| 22 | -80.9195 | 24.77859 | -80.9235 | 24.77714 | 0.078828829 | Ovrs Hwy | Ovrs Hwy |
| 23 | -80.6409 | 24.91317 | -80.9195 | 24.77859 | 0.066066066 | Ovrs Hwy | Ovrs Hwy |
| 24 | -80.3747 | 25.17075 | -80.6409 | 24.91317 | 0.063063063 | Ovrs Hwy | Ovrs Hwy |
| 25 | -80.3743 | 25.17160 | -80.3747 | 25.17075 | 0.043543544 | Ovrs Hwy | Ovrs Hwy |

FIG. 11

| Bridge Rank | Node Long. | Node Lat. | Closeness Centrality | Roads | Bridges |
|---|---|---|---|---|---|
| 1 | -80.2637 | 25.7717 | 0.015244 | W Flagler St | W FLAGLER ST |
| 2 | -80.2392 | 25.7723 | 0.014857 | W Flagler St | W FLAGLER ST |
| 3 | -80.2735 | 25.7340 | 0.014087 | Granada Blvd | GRANADA BLVD |
| 4 | -80.2727 | 25.8082 | 0.014011 | East Dr | EAST DR |
| 5 | -80.2897 | 25.7043 | 0.013923 | Sunset Dr | SUNSET DR |
| 6 | -80.2727 | 25.8081 | 0.013721 | East Dr | EAST DR |
| 7 | -80.2899 | 25.7042 | 0.013622 | Sunset Dr | SUNSET DR |
| 8 | -80.1886 | 25.7795 | 0.012464 | Biscayne Blvd | BISCAYNE BLVD |
| 9 | -80.1893 | 25.7820 | 0.012332 | Biscayne Blvd | BISCAYNE BLVD |
| 10 | -80.1889 | 25.7801 | 0.012222 | Biscayne Blvd | BISCAYNE BLVD |
| 11 | -80.1893 | 25.7839 | 0.012096 | Biscayne Blvd | BISCAYNE BLVD |
| 12 | -80.1892 | 25.7801 | 0.011950 | Biscayne Blvd | BISCAYNE BLVD |
| 13 | -80.1891 | 25.7853 | 0.011868 | Biscayne Blvd | BISCAYNE BLVD |
| 14 | -80.1889 | 25.7792 | 0.011735 | Biscayne Blvd | BISCAYNE BLVD |
| 15 | -80.1890 | 25.7861 | 0.011649 | Biscayne Blvd | BISCAYNE BLVD |
| 16 | -80.1891 | 25.7870 | 0.011632 | Biscayne Blvd | BISCAYNE BLVD |
| 17 | -80.1891 | 25.7883 | 0.011492 | Biscayne Blvd | BISCAYNE BLVD |
| 18 | -80.1890 | 25.7861 | 0.011438 | Biscayne Blvd | BISCAYNE BLVD |
| 19 | -80.1891 | 25.7861 | 0.011421 | Biscayne Blvd | BISCAYNE BLVD |
| 20 | -80.1891 | 25.7896 | 0.011355 | Biscayne Blvd | BISCAYNE BLVD |

FIG. 12

| Unweighted Rank | Weighted Rank | Start Long. | Start Lat. | End Long. | End Lat. | Weight (AADT) | Unweighted Edge betweenness centrality | Weighted Edge betweenness centrality | Road/Bridge |
|---|---|---|---|---|---|---|---|---|---|
| 1 | 1 | -80.1889 | 25.7801 | -80.1893 | 25.7820 | 37297 | 0.07915 | 0.06897 | Bscn Blvd |
| 2 | 2 | -80.1886 | 25.7795 | -80.1889 | 25.7801 | 26070 | 0.07915 | 0.06897 | Bscn Blvd |
| 3 | 3 | -80.1890 | 25.7861 | -80.1891 | 25.7870 | 35988 | 0.07759 | 0.06727 | Bscn Blvd |
| 4 | 4 | -80.1890 | 25.7861 | -80.1890 | 25.7861 | 37500 | 0.07758 | 0.06727 | Bscn Blvd |
| 5 | 5 | -80.1891 | 25.7853 | -80.1891 | 25.7861 | 37500 | 0.07758 | 0.06726 | Bscn Blvd |
| 6 | 6 | -80.1893 | 25.7839 | -80.1891 | 25.7853 | 37930 | 0.07757 | 0.06726 | Bscn Blvd |
| 7 | 7 | -80.1893 | 25.7820 | -80.1893 | 25.7839 | 38000 | 0.07757 | 0.06726 | Bscn Blvd |
| 8 | 8 | -80.1891 | 25.7870 | -80.1891 | 25.7883 | 33500 | 0.07597 | 0.06496 | Bscn Blvd |
| 9 | 9 | -80.1891 | 25.7883 | -80.1891 | 25.7896 | 33500 | 0.07518 | 0.06476 | Bscn Blvd |
| 10 | 19 | -80.1220 | 25.9299 | -80.1219 | 25.9304 | 54000 | 0.07515 | 0.06239 | Clns Ave |
| 11 | 10 | -80.1891 | 25.7896 | -80.1890 | 25.7962 | 33500 | 0.07500 | 0.06456 | Bscn Blvd |
| 12 | 11 | -80.1890 | 25.7962 | -80.1894 | 25.8043 | 36018 | 0.07481 | 0.06436 | Bscn Blvd |
| 13 | 12 | -80.1894 | 25.8043 | -80.1894 | 25.8107 | 33067 | 0.07462 | 0.06415 | Bscn Blvd |
| 14 | 13 | -80.1894 | 25.8107 | -80.1894 | 25.8114 | 42500 | 0.07444 | 0.06395 | Bscn Blvd |
| 15 | 14 | -80.1894 | 25.8114 | -80.1894 | 25.8116 | 42500 | 0.07426 | 0.06375 | Bscn Blvd |
| 16 | 15 | -80.1894 | 25.8116 | -80.1893 | 25.8124 | 116000 | 0.07408 | 0.06354 | Bscn Blvd |
| 17 | 16 | -80.1891 | 25.8134 | -80.1869 | 25.8255 | 35768 | 0.07404 | 0.06346 | Bscn Blvd |
| 18 | 17 | -80.1893 | 25.8124 | -80.1891 | 25.8134 | 35500 | 0.07403 | 0.06346 | Bscn Blvd |
| 19 | 18 | -80.1840 | 25.8327 | -80.1841 | 25.8333 | 40000 | 0.07330 | 0.06263 | Bscn Blvd |
| 20 | 22 | -80.1227 | 25.8871 | -80.1220 | 25.9299 | 49883 | 0.07327 | 0.06079 | Clns Ave |
| 21 | 20 | -80.1841 | 25.8333 | -80.1841 | 25.8334 | 40000 | 0.07261 | 0.06189 | Bscn Blvd |
| 22 | 21 | -80.1841 | 25.8334 | -80.1846 | 25.8478 | 40000 | 0.07242 | 0.06168 | Bscn Blvd |
| 23 | 51 | -80.1539 | 25.9262 | -80.1559 | 25.9262 | 51500 | 0.04996 | 0.04168 | Bscn Blvd |
| 24 | 57 | -80.2637 | 25.7717 | -80.2634 | 25.7644 | 44000 | 0.04650 | 0.03403 | W Flgr St |
| 25 | 24 | -80.1889 | 25.7792 | -80.1878 | 25.7753 | 36000 | 0.04698 | 0.04621 | Bscn Blvd |

FIG. 13

| | | | | | | | | |
|---|---|---|---|---|---|---|---|---|
| 26 | 45 | -80.2897 | 25.7043 | -80.2899 | 25.7042 | 41786 | 0.04696 | 0.03609 | Sunset Dr |
| 27 | 26 | -80.1892 | 25.7801 | -80.1889 | 25.7792 | 26493 | 0.04568 | 0.04690 | Bscn Blvd |
| 28 | 27 | -80.1896 | 25.7839 | -80.1895 | 25.7820 | 38000 | 0.04439 | 0.04550 | Bscn Blvd |
| 29 | 28 | -80.1893 | 25.7855 | -80.1896 | 25.7839 | 37900 | 0.04439 | 0.04549 | Bscn Blvd |
| 30 | 29 | -80.1892 | 25.7860 | -80.1893 | 25.7855 | 37500 | 0.04438 | 0.04549 | Bscn Blvd |
| 31 | 30 | -80.1891 | 25.7861 | -80.1892 | 25.7860 | 37500 | 0.04438 | 0.04549 | Bscn Blvd |
| 32 | 31 | -80.1891 | 25.7870 | -80.1891 | 25.7861 | 33500 | 0.04437 | 0.06496 | Bscn Blvd |
| 33 | 52 | -80.2899 | 25.7042 | -80.2909 | 25.7034 | 73000 | 0.04420 | 0.03320 | Sunset Dr |
| 34 | 32 | -80.1891 | 25.7883 | -80.1891 | 25.7870 | 33500 | 0.04215 | 0.06476 | Bscn Blvd |
| 35 | 33 | -80.1891 | 25.7896 | -80.1891 | 25.7883 | 33500 | 0.04196 | 0.06456 | Bscn Blvd |
| 36 | 34 | -80.1890 | 25.7962 | -80.1891 | 25.7896 | 36018 | 0.04177 | 0.06436 | Bscn Blvd |
| 37 | 35 | -80.1894 | 25.8043 | -80.1890 | 25.7962 | 33067 | 0.04158 | 0.06415 | Bscn Blvd |
| 38 | 36 | -80.1894 | 25.8107 | -80.1894 | 25.8043 | 42500 | 0.04139 | 0.06395 | Bscn Blvd |
| 39 | 37 | -80.1894 | 25.8114 | -80.1894 | 25.8107 | 42500 | 0.04120 | 0.06375 | Bscn Blvd |
| 40 | 38 | -80.1894 | 25.8116 | -80.1894 | 25.8114 | 118030 | 0.04102 | 0.06354 | Bscn Blvd |
| 41 | 39 | -80.1893 | 25.8124 | -80.1894 | 25.8116 | 35500 | 0.04083 | 0.06346 | Bscn Blvd |
| 42 | 40 | -80.1892 | 25.8134 | -80.1893 | 25.8124 | 35500 | 0.04078 | 0.04165 | Bscn Blvd |
| 43 | 41 | -80.1841 | 25.8327 | -80.1870 | 25.8255 | 40000 | 0.04003 | 0.04081 | Bscn Blvd |
| 44 | 42 | -80.1841 | 25.8333 | -80.1841 | 25.8327 | 40000 | 0.04002 | 0.06189 | Bscn Blvd |
| 45 | 43 | -80.1841 | 25.8334 | -80.1841 | 25.8333 | 40000 | 0.03933 | 0.06168 | Bscn Blvd |
| 46 | 23 | -80.3684 | 25.5797 | -80.3664 | 25.5818 | 53500 | 0.03618 | 0.04849 | Carlon Blvd |
| 47 | 25 | -80.3595 | 25.5890 | -80.3541 | 25.5986 | 53500 | 0.03588 | 0.04817 | Marlin Rd |
| 48 | 44 | -80.2392 | 25.7723 | -80.2389 | 25.7652 | 38000 | 0.03092 | 0.03977 | W Flagler St |
| 49 | 46 | -80.1234 | 25.8160 | -80.1211 | 25.8420 | 42904 | 0.02705 | 0.03609 | Clns Ave |
| 50 | 47 | -80.1229 | 25.8138 | -80.1234 | 25.8160 | 15000 | 0.02704 | 0.03608 | Clns Ave |

*Unweighted road-bridge network is considered as the base network for comparison

FIG. 14

| Bridge Rank | Node Long. | Node Lat. | Closeness Centrality | Roads | Bridges |
|---|---|---|---|---|---|
| 1 | -80.8036 | 27.6697 | 0.006676 | State Road 60 | STATE ROAD 60 |
| 2 | -80.6435 | 27.6402 | 0.006616 | State Road 60 | STATE ROAD 60 |
| 3 | -81.8435 | 27.9045 | 0.006615 | Van Fleet Dr | VAN FLEET DR |
| 4 | -81.9575 | 28.0550 | 0.006588 | N Florida Ave | N FLORIDA AVE |
| 5 | -81.9407 | 28.0441 | 0.006564 | E Main St | E MAIN ST |
| 6 | -81.9409 | 28.0441 | 0.006561 | E Main St | E MAIN ST |
| 7 | -80.6435 | 27.6405 | 0.006557 | State Road 60 | STATE ROAD 60 |
| 8 | -81.9573 | 28.0555 | 0.006535 | N Florida Ave | N FLORIDA AVE |
| 9 | -81.9469 | 28.0441 | 0.006532 | E Main St | E MAIN ST |
| 10 | -81.9573 | 28.0548 | 0.006532 | N Florida Ave | N FLORIDA AVE |
| 11 | -81.9575 | 28.0548 | 0.006532 | N Florida Ave | N FLORIDA AVE |
| 12 | -81.9703 | 28.0549 | 0.006532 | Kathleen Rd | KATHLEEN RD |
| 13 | -82.1703 | 28.5078 | 0.006517 | Treiman Blvd | TREIMAN BLVD |
| 14 | -80.8034 | 27.6699 | 0.006497 | State Road 60 | STATE ROAD 60 |
| 15 | -82.1953 | 28.5079 | 0.006487 | Cortez Blvd | CORTEZ BLVD |
| 16 | -81.9574 | 28.0497 | 0.006473 | George Jenkins Blvd | GEORGE JENKINS BLVD |
| 17 | -81.9705 | 28.0549 | 0.006473 | Kathleen Rd | KATHLEEN RD |
| 18 | -82.204 | 28.3649 | 0.006469 | Meridian Ave | MERIDIAN AVE |
| 19 | -82.1931 | 28.5079 | 0.006469 | Cortez Blvd | CORTEZ BLVD |
| 20 | -81.9412 | 28.0550 | 0.006462 | E Memorial Blvd | E MEMORIAL BLVD |

FIG. 15

| Unweighted Rank | Weighted Rank | Start Long. | Start Lat. | End Long. | End Lat. | Weight (AADT) | Unweighted Edge betweenness centrality | Weighted Edge betweenness centrality | Road/Bridge |
|---|---|---|---|---|---|---|---|---|---|
| 1 | 1 | -81.3583 | 27.2972 | -81.3626 | 27.3174 | 17800 | 0.06122 | 0.08552 | US-27 S |
| 2 | 294 | -81.9412 | 28.0550 | -81.9569 | 28.0550 | 35888 | 0.05924 | 0.00931 | E Memorial Blvd |
| 3 | 93 | -81.8435 | 27.9045 | -81.8433 | 27.9040 | 38000 | 0.05531 | 0.03117 | Van Fleet Dr |
| 4 | 2 | -81.9573 | 28.0556 | -81.9573 | 28.0624 | 35000 | 0.05501 | 0.08386 | N Florida Ave |
| 5 | 452 | -81.9569 | 28.0550 | -81.9573 | 28.0556 | 24500 | 0.05375 | 0.00509 | Memorial Blvd |
| 6 | 1078 | -81.9407 | 28.0442 | -81.9408 | 28.0546 | 12800 | 0.05219 | 0.00103 | E Main St |
| 7 | 67 | -81.9573 | 28.0549 | -81.9412 | 28.0549 | 34253 | 0.04983 | 0.07877 | N Florida Ave |
| 8 | 80 | -81.9575 | 28.0550 | -81.9573 | 28.0549 | 24500 | 0.04784 | 0.04464 | N Florida Ave |
| 9 | 94 | -81.9409 | 28.0442 | -81.9408 | 28.0385 | 12800 | 0.04627 | 0.03103 | E Main St |
| 10 | 6 | -81.9574 | 28.0624 | -81.9575 | 28.0550 | 35000 | 0.04516 | 0.07378 | N Florida Ave |
| 11 | 437 | -81.8014 | 27.7520 | -81.8215 | 27.8202 | 16000 | 0.03936 | 0.00598 | US-17 N |
| 12 | 438 | -81.8215 | 27.8202 | -81.8216 | 27.8209 | 16000 | 0.03936 | 0.00598 | US-17 N |
| 13 | 36 | -84.3875 | 30.0843 | -84.3806 | 30.1042 | 8700 | 0.03679 | 0.04569 | Coastal Hwy |
| 14 | 55 | -81.5145 | 27.5955 | -81.4952 | 27.5148 | 30000 | 0.03533 | 0.04256 | W Main St |
| 15 | 13 | -84.3804 | 30.1047 | -84.3875 | 30.0843 | 8700 | 0.03497 | 0.06014 | Coastal Hwy |
| 16 | 20 | -80.4400 | 26.1369 | -80.4423 | 26.1473 | 10810 | 0.03428 | 0.05159 | US-27 N |
| 17 | 56 | -81.3585 | 27.2972 | -81.3585 | 27.2971 | 17800 | 0.03418 | 0.08552 | US-27 S |
| 18 | 10 | -81.4174 | 26.4185 | -81.4093 | 26.4180 | 6952 | 0.03531 | 0.06236 | E Main St |
| 19 | 11 | -81.4093 | 26.4180 | -81.4089 | 26.4179 | 6700 | 0.03531 | 0.06236 | E Main St |
| 20 | 57 | -82.0455 | 28.8471 | -82.0455 | 28.8367 | 14000 | 0.03293 | 0.04187 | S Main St |
| 21 | 58 | -82.0455 | 28.8367 | -82.0455 | 28.8361 | 12197 | 0.03293 | 0.04187 | S Main St |
| 22 | 40 | -82.6120 | 28.9231 | -82.6267 | 28.9526 | 16900 | 0.03271 | 0.04460 | N Suncoast Blvd |
| 23 | 41 | -82.6267 | 28.9526 | -82.6352 | 28.9696 | 16900 | 0.03271 | 0.04460 | N Suncoast Blvd |
| 24 | 42 | -82.6352 | 28.9696 | -82.6354 | 28.9700 | 16900 | 0.03271 | 0.04460 | N Suncoast Blvd |
| 25 | 43 | -82.6354 | 28.9700 | -82.6691 | 29.0304 | 8616 | 0.03271 | 0.04460 | N Suncoast Blvd |
| 26 | 21 | -82.1953 | 28.5078 | -82.1704 | 28.5078 | 16500 | 0.03271 | 0.05638 | Cortez Blvd |
| 27 | 22 | -83.2381 | 26.5231 | -82.2358 | 26.5231 | 16820 | 0.03267 | 0.05117 | Cortez Blvd |

FIG. 16

| | | | | | | | | |
|---|---|---|---|---|---|---|---|---|
| 28 | -82.2358 | 28.5231 | -82.1975 | 28.5078 | 16500 | 0.03263 | 0.05113 | Cortez Blvd |
| 29 | 3225 | -82.1975 | 28.5078 | -82.1953 | 28.5078 | 16500 | 0.03263 | 0.05638 | Cortez Blvd |
| 30 | 24 | -82.3671 | 28.5428 | -82.3031 | 28.5231 | 19100 | 0.03248 | 0.05090 | Cortez Blvd |
| 31 | 45 | -82.8232 | 29.4170 | -82.8596 | 29.4748 | 3400 | 0.03207 | 0.04400 | S Main St |
| 32 | 46 | -82.8596 | 29.4748 | -82.8600 | 29.4876 | 9153 | 0.03207 | 0.04400 | S Main St |
| 33 | 59 | -82.0430 | 28.8583 | -82.0455 | 28.8476 | 18144 | 0.03188 | 0.03975 | S Main St |
| 34 | 60 | -82.0455 | 28.8476 | -82.0455 | 28.8471 | 14000 | 0.03188 | 0.03975 | S Main St |
| 35 | 69 | -80.5827 | 27.0963 | -80.6773 | 27.1590 | 7100 | 0.03142 | 0.05019 | SW Warfield Blvd |
| 36 | 70 | -80.4824 | 27.0305 | -80.5827 | 27.0963 | 10847 | 0.03139 | 0.05016 | SW Warfield Blvd |
| 37 | 71 | -80.4468 | 27.0065 | -80.4495 | 27.0085 | 10900 | 0.03137 | 0.05009 | SW Warfield Blvd |
| 38 | 72 | -80.4495 | 27.0085 | -80.4824 | 27.0305 | 10842 | 0.03137 | 0.03470 | SW Warfield Blvd |
| 39 | 503 | -82.4037 | 28.5402 | -82.3691 | 28.5422 | 22132 | 0.03057 | 0.00433 | Cortez Blvd |
| 40 | 504 | -82.3691 | 28.5422 | -82.3671 | 28.5428 | 19356 | 0.03057 | 0.00433 | Cortez Blvd |
| 41 | 3247 | -81.5145 | 27.5956 | -81.5145 | 27.5955 | 9500 | 0.03026 | 0.03219 | W Main St |
| 42 | 14 | -82.1953 | 28.5080 | -82.2359 | 28.5232 | 16500 | 0.03015 | 0.05771 | Cortez Blvd |
| 43 | 3235 | -82.2359 | 28.5232 | -82.2382 | 28.5232 | 16900 | 0.03015 | 0.05771 | Cortez Blvd |
| 44 | 15 | -82.2382 | 28.5232 | -82.2303 | 28.5233 | 16900 | 0.03015 | 0.05771 | Cortez Blvd |
| 45 | 73 | -84.2156 | 30.1906 | -84.1836 | 30.1998 | 3497 | 0.03009 | 0.03379 | Coastal Hwy |
| 46 | 74 | -84.2465 | 30.1737 | -84.2156 | 30.1906 | 3497 | 0.03006 | 0.03374 | Coastal Hwy |
| 47 | 75 | -84.3138 | 30.1409 | -84.2465 | 30.1737 | 3500 | 0.03002 | 0.03370 | Coastal Hwy |
| 48 | 47 | -82.4207 | 28.5525 | -82.4208 | 28.5777 | 13900 | 0.03001 | 0.04377 | W Jefferson St |
| 49 | 76 | -84.3806 | 30.1042 | -84.3801 | 30.1050 | 10011 | 0.02998 | 0.03367 | Coastal Hwy |
| 50 | 77 | -84.3801 | 30.1050 | -84.3138 | 30.1409 | 4700 | 0.02998 | 0.03367 | Coastal Hwy |

*Unweighted road-bridge network is considered as the base network for comparison

FIG. 17

| Node Coordinates | | Bridge Rank | | | Closeness Centrality | | | Roads/Bridges |
|---|---|---|---|---|---|---|---|---|
| Long. | Lat. | Florida | Miami-Dade | Miami Beach | Florida | Miami-Dade | Miami Beach | |
| -80.1220 | 25.9299 | 1199 | 37 | 1 | 0.004509 | 0.009720 | 0.020644 | Collins Ave |
| -80.1204 | 25.9538 | 1252 | 45 | 2 | 0.004460 | 0.009349 | 0.019895 | Collins Ave |
| -80.1469 | 25.9552 | 1279 | 56 | 3 | 0.004435 | 0.009043 | 0.019278 | Biscayne Blvd |
| -80.1202 | 25.9556 | 1284 | 49 | 4 | 0.004432 | 0.009227 | 0.019172 | S Ocean Dr |
| -80.1207 | 25.9501 | 1262 | 42 | 5 | 0.004453 | 0.009429 | 0.019137 | Collins Ave |
| -80.1540 | 25.9260 | 1144 | 54 | 6 | 0.004563 | 0.009087 | 0.019049 | Biscayne Blvd |
| -80.1539 | 25.9262 | 1288 | 51 | 7 | 0.004428 | 0.009170 | 0.018985 | Biscayne Blvd |
| -80.1469 | 25.9601 | 1306 | 55 | 8 | 0.004414 | 0.009056 | 0.018747 | Biscayne Blvd |
| -80.1537 | 25.9260 | 1172 | 58 | 9 | 0.004534 | 0.008971 | 0.018609 | Biscayne Blvd |
| -80.1469 | 25.9550 | 1316 | 61 | 10 | 0.004408 | 0.008915 | 0.018579 | Biscayne Blvd |
| -80.1193 | 25.9860 | 1319 | 53 | 11 | 0.004405 | 0.009108 | 0.018501 | S Ocean Dr |
| -80.1423 | 25.9856 | 1317 | 64 | 12 | 0.004407 | 0.008830 | 0.018413 | Federal Hwy |
| -80.1564 | 25.9168 | 1173 | 59 | 13 | 0.004534 | 0.008958 | 0.018380 | Biscayne Blvd |
| -80.1847 | 25.8501 | 1404 | 36 | 14 | 0.004312 | 0.009857 | 0.018343 | Biscayne Blvd |
| -80.1841 | 25.8334 | 1427 | 34 | 15 | 0.004281 | 0.010089 | 0.018297 | Biscayne Blvd |
| -80.1841 | 25.8333 | 1435 | 32 | 16 | 0.004266 | 0.010192 | 0.018170 | Biscayne Blvd |
| -80.1535 | 25.9266 | 1207 | 63 | 17 | 0.004505 | 0.008844 | 0.017965 | Biscayne Blvd |
| -80.1468 | 25.9497 | 1348 | 65 | 18 | 0.004380 | 0.008790 | 0.017937 | Biscayne Blvd |
| -80.1508 | 25.9347 | 1220 | 67 | 19 | 0.004492 | 0.008729 | 0.017911 | Biscayne Blvd |
| -80.1849 | 25.8562 | 1424 | 39 | 20 | 0.004286 | 0.009706 | 0.017737 | Biscayne Blvd |

\* Miami Beach road-bridge network is considered as the base network for comparison

FIG. 18

| Link Coordinates | | | | Florida | Bridge Rank | | | Edge Betweenness Centrality | | | Roads/Bridges |
|---|---|---|---|---|---|---|---|---|---|---|---|
| Start Long. | Start Lat. | End Long. | End Lat. | Florida | Miami-Dade | Miami Beach | Florida | Miami-Dade | Miami Beach | | |
| -80.1220 | 25.9299 | -80.1219 | 25.9304 | 258 | 10 | 1 | 0.01022 | 0.07515 | 0.08365 | Collins Ave |
| -80.1227 | 25.8871 | -80.1220 | 25.9299 | 355 | 20 | 2 | 0.00747 | 0.07327 | 0.07132 | Collins Ave |
| -80.1840 | 25.8327 | -80.1841 | 25.8333 | 494 | 19 | 3 | 0.00412 | 0.07330 | 0.06068 | Biscayne Blvd |
| -80.1841 | 25.8334 | -80.1846 | 25.8478 | 491 | 22 | 4 | 0.00418 | 0.07242 | 0.06039 | Biscayne Blvd |
| -80.1841 | 25.8333 | -80.1841 | 25.8334 | 493 | 21 | 5 | 0.00414 | 0.07261 | 0.06026 | Biscayne Blvd |
| -80.1893 | 25.8124 | -80.1891 | 25.8134 | 502 | 18 | 6 | 0.00403 | 0.07403 | 0.06015 | Biscayne Blvd |
| -80.1891 | 25.8134 | -80.1869 | 25.8255 | 503 | 17 | 7 | 0.00404 | 0.07404 | 0.06009 | Biscayne Blvd |
| -80.1893 | 25.7850 | -80.1893 | 25.7859 | 497 | 7 | 8 | 0.00408 | 0.07757 | 0.05974 | Biscayne Blvd |
| -80.1893 | 25.7859 | -80.1891 | 25.7853 | 498 | 6 | 9 | 0.00408 | 0.07757 | 0.05968 | Biscayne Blvd |
| -80.1891 | 25.7853 | -80.1890 | 25.7861 | 499 | 5 | 10 | 0.00408 | 0.07758 | 0.05962 | Biscayne Blvd |
| -80.1890 | 25.7861 | -80.1891 | 25.7861 | 500 | 4 | 11 | 0.00406 | 0.07758 | 0.05956 | Biscayne Blvd |
| -80.1890 | 25.7861 | -80.1891 | 25.7870 | 501 | 3 | 12 | 0.00406 | 0.07759 | 0.05950 | Biscayne Blvd |
| -80.1894 | 25.8116 | -80.1893 | 25.8124 | 520 | 16 | 13 | 0.00390 | 0.07408 | 0.05908 | Biscayne Blvd |
| -80.1894 | 25.8114 | -80.1894 | 25.8116 | 523 | 15 | 14 | 0.00387 | 0.07426 | 0.05891 | Biscayne Blvd |
| -80.1894 | 25.8107 | -80.1894 | 25.8114 | 531 | 14 | 15 | 0.00386 | 0.07444 | 0.05874 | Biscayne Blvd |
| -80.1894 | 25.8043 | -80.1894 | 25.8107 | 533 | 13 | 16 | 0.00384 | 0.07462 | 0.05856 | Biscayne Blvd |
| -80.1890 | 25.7962 | -80.1894 | 25.8043 | 536 | 12 | 17 | 0.00383 | 0.07481 | 0.05838 | Biscayne Blvd |
| -80.1891 | 25.7896 | -80.1890 | 25.7962 | 539 | 11 | 18 | 0.00382 | 0.07500 | 0.05820 | Biscayne Blvd |
| -80.1891 | 25.7883 | -80.1891 | 25.7896 | 540 | 9 | 19 | 0.00381 | 0.07518 | 0.05801 | Biscayne Blvd |
| -80.1891 | 25.7870 | -80.1891 | 25.7883 | 537 | 8 | 20 | 0.00382 | 0.07537 | 0.05781 | Biscayne Blvd |

* Miami Beach road-bridge network is considered as the base network for comparison

FIG. 19

SYSTEMS AND METHODS FOR ANALYZING A PHYSICAL INFRASTRUCTURE

GOVERNMENT SUPPORT

This invention was made with government support under 69A3551747121 awarded by United States Department of Transportation (USDOT). The government has certain rights in the invention.

BACKGROUND

Transportation infrastructure requires huge amounts of annual investment, which is mainly for maintenance, restoration, and replacement of the assets, and can form the lifeblood of the economy. Infrastructure aging, increased frequency of use, intensity of severe weather, and increasing traffic loads can increase overall expenditure. There is no exception to these requirements for over 685,000 bridges in the United States. In the process of advancement of modern building strategies, planning methods, and management policies, several factors play vital roles, including the importance of the bridge network for transport and economic growth, the substantial investment in maintenance/replacement, and the effects of bridge closures on the socio-spatial stability of society. The cost-effective prioritization requirement of the large portfolio of the repair and replacement of deteriorating bridges is one of the main challenges faced by transportation asset managers considering growing budgetary constraints. The decision-making processes are exacerbated by the indirect costs (e.g., traffic delay) related to the closure times during these activities (see also Alipour et al., An Integrated Project to Enterprise-Level Decision-Making Framework for Prioritization of Accelerated Bridge Construction, Final report from Bridge Engineering Center Institute for Transportation, Iowa State University, 2018).

Accelerated Bridge Construction (ABC) methods have been gaining acceptance as a substitute for conventional construction, to reduce the work period and diminish the site closure impact at the system level. There are various ABC forms and there are limitations and completion speeds in each technique. The selection of the ABC technique depends on a number of factors, including its accessibility at different bridge locations, the criticality of the bridge to the network, and its availability. Many of these factors appear to have conflicting effects, as higher rates of investment often result from a faster ABC technique, whereas faster technology to link a bridge with high network criticality can lead to large user costs saving (see also Alipour et al., An Integrated Project . . . , 2018, supra.).

The major aspects impacting the timelines for ABC projects are the effects of the closures and the socio-economic aspects of the community. Therefore, the value of indirect costs is acknowledged in most entities, with the exception that some do not have a quantitative language to compensate for it in the final decisions. Many state-level decisions are made based on the qualitative data and public discussions in a district.

ABC methods can minimize several uncertainties associated with construction procedures and functions throughout the life span of a bridge. ABC project applications are categorized in six tiers based on the project mobility/traffic impact time ranging from one day (Tier 1) to several months (Tier 6), with considerable reduction of time from the conventional options. For example, a project for which the entire superstructure has been assembled off-line and moved in place within just 24 hours will be specified as Tier 1 while Tier 6 will include impacting for example a statewide bridge replacement program by months or years through implementing Tier 1 to 5 projects for individual bridges in the network. However, these options may translate to variable costs, with higher costs for shorter duration. Consequently, selection of the ABC method will impact the cost according to the advantage it offers for time. This trend is one of the factors to be considered on when analyzing ABC options (see also Shane and Alipour, Development of Guidelines to Establish Effective and Efficient Timelines and Incentives for ABC, Final report from Bridge Engineering Center Institute for Transportation, Iowa State University, 2018).

BRIEF SUMMARY

Embodiments of the subject invention provide novel and advantageous systems, methods, and frameworks for analyzing a physical network or infrastructure (e.g., a network of bridges and/or roads) using network science principles and identifying the topological credentials of physical locations (e.g., influence rankings of bridges and/or roads) within the physical network. Embodiments can assess the vulnerability and resilience of the physical network based on network science principles and/or graph theory to identify the most central physical locations to assist with decision making for maintenance, repair, and/or construction within the physical network. Connectivity of the physical locations within the physical network can be treated as a network (i.e., a network according to network science principles) to assess the interdependence between the connectivity of the system components and their functional behavior. These network links and nodes can be analyzed with respect to the resilience metrics determine the critical components (e.g., to enhance the resiliency by determining the critical components) of a physical network system that are most susceptible to external shocks. Once the vulnerabilities have been identified, priorities can be set to improve the different vulnerable sections of the physical network system. Also, a plan can be developed to improve the resiliency of some or all of the different physical components of the physical network system.

In an embodiment, a system for analyzing a physical infrastructure can comprise: a processor; and a machine-readable medium in operable communication with the processor and having instructions stored thereon that, when executed by the processor, perform the following steps: a) receiving (e.g., by the processor) first data regarding physical components within the physical infrastructure, the first data comprising geographic information system (GIS) coordinates of the respective physical components; b) converting (e.g., by the processor) the first data to a network graph; and c) performing (e.g., by the processor) a network analysis on the network graph to determine a ranking or the topological credentials of the physical components within the physical infrastructure. The instructions when executed can further perform the following step: d) utilizing (e.g., by a user of the system) the ranking to determine a plan (e.g., an optimal sequencing plan) for the physical components, the plan being a plan for at least one of operation, maintenance, repair, and construction. The physical components can comprise at least one of bridges and roads. The plan can be an Accelerated Bridge Construction (ABC) plan. The performing of the network analysis on the network graph can comprise performing at least one of: a closeness centrality analysis on a node property of the network graph; and an edge betweenness centrality analysis on a link property of the network graph. The ranking can comprise at least one of a ranking of the physical components with the highest closeness centrality and a ranking of the physical components with the highest edge betweenness centrality. The performing of the network analysis can comprise performing a weighted edge betweenness centrality analysis on a link property of the network graph, the weighted edge betweenness centrality analysis comprising using at least one weighting variable. The at least one weighting variable can comprise a count of items passing by each physical component. The at least one weighting variable can comprise, for example, at least one of a traffic count, a traffic volume, and a traffic delay. The ranking can comprise a ranking of the physical components with the highest weighted edge betweenness centrality.

In another embodiment, a method for analyzing a physical infrastructure can comprise: a) receiving (e.g., by a processor) first data regarding physical components within a physical infrastructure, the first data comprising GIS coordinates of the respective physical components; b) converting (e.g., by the processor) the first data to a network graph; and c) performing (e.g., by the processor) a network analysis on the network graph to determine a ranking of the most influential physical components within the physical infrastructure. The method can further comprise: d) utilizing (e.g., by a user of a system having the processor) the ranking to determine a plan (e.g., an optimal sequencing plan) for the physical components, the plan being a plan for at least one of operation, maintenance, repair, and construction. The physical components can comprise at least one of bridges and roads. The plan can be an ABC plan. The performing of the network analysis on the network graph can comprise performing at least one of: a closeness centrality analysis on a node property of the network graph; and an edge betweenness centrality analysis on a link property of the network graph. The ranking can comprise at least one of a ranking of the physical components with the highest closeness centrality and a ranking of the physical components with the highest edge betweenness centrality. The performing of the network analysis can comprise performing a weighted edge betweenness centrality analysis on a link property of the network graph, the weighted edge betweenness centrality analysis comprising using at least one weighting variable. The at least one weighting variable can comprise a count of items passing by each physical component. The at least one weighting variable can comprise, for example, at least one of a traffic count, a traffic volume, and a traffic delay. The ranking can comprise a ranking of the physical components with the highest weighted edge betweenness centrality.

BRIEF DESCRIPTION OF DRAWINGS

FIG. 8(b) shows a map of the Miami-Dade County road-bridge network. The (red) solid lines are for roadways; and the (black) dots are for bridges.

FIG. 8(c) shows a map of the Key West road-bridge network. The (red) solid lines are for roadways; and the (black) dots are for bridges.

FIG. 10 shows a table of closeness centrality values for the Key West road-bridge network.

FIG. 11 shows a table of edge betweenness centrality values for the Key West road-bridge network.

FIG. 12 shows a table of closeness centrality values for the Miami-Dade County road-bridge network.

FIG. 13 shows the first 25 rows of a table of edge betweenness centrality values for the Miami-Dade County road-bridge network. The table in FIG. 13 is continued in FIG. 14.

FIG. 14 shows the last 25 rows of a table of edge betweenness centrality values for the Miami-Dade County road-bridge network. The table in FIG. 14 is continued from FIG. 13.

FIG. 15 shows a table of closeness centrality values for the Florida road-bridge network.

FIG. 16 shows the first 25 rows of a table of edge betweenness centrality values for the Florida road-bridge network. The table in FIG. 16 is continued in FIG. 17.

FIG. 17 shows the last 25 rows of a table of edge betweenness centrality values for the Florida road-bridge network. The table in FIG. 17 is continued from FIG. 16.

FIG. 18 shows a table of scaling effects based on node property (unweighted closeness centrality) of a network.

FIG. 19 shows a table of scaling effects based on link property (unweighted betweenness centrality) of a network.

DETAILED DESCRIPTION

Figures 1A, 1B, 1C:
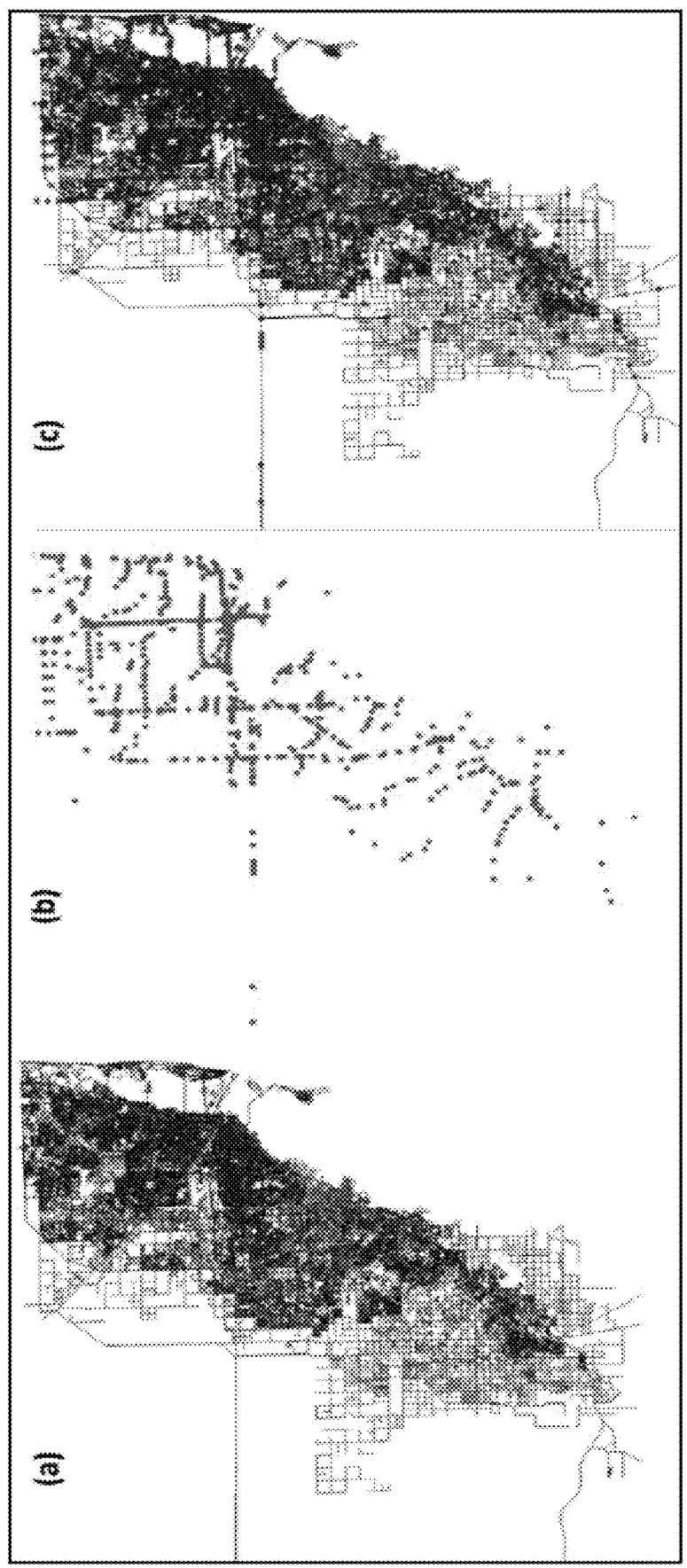
FIG. 1(a) shows an example map of the Miami-Dade County road network.
FIG. 1(b) shows an example map of the Miami-Dade County bridge network.
FIG. 1(c) shows an example map of the Miami-Dade County road and bridge network superimposed together.

Embodiments of the subject invention provide novel and advantageous systems, methods, and frameworks for analyzing the topological credentials of a physical network or infrastructure (e.g., a network of bridges and/or roads) using network science principles and identifying the most influential physical locations (e.g., bridges and/or roads) within the physical network. Embodiments can assess the vulnerability and resilience of the physical network based on network science principles and/or graph theory to identify the most central physical locations to assist with decision making for maintenance, repair, and/or construction within the physical network. Connectivity of the physical locations within the physical network can be treated as a network (i.e., a network according to network science principles) to assess the interdependence between the connectivity of the system components and their functional behavior. These network links and nodes can be analyzed to assess the system resiliency (or enhance the system resiliency) by determining the critical components of a physical network system that are most susceptible to external shocks. Once the vulnerabilities have been identified, priorities can be set to improve the different vulnerable sections of the physical network system. Also, a plan can be developed to improve the resiliency of some or all of the different physical components of the physical network system.

Embodiments not only integrate traditional geographic information systems (GIS) with more emergent network theories, but also allow assessments of network resilience in physical infrastructure systems such as road, water, sewer, and utility systems. Systems and methods of embodiments of the subject invention can be used, for example, to guide Accelerated Bridge Construction (ABC) activities. Systems and methods of embodiments of the subject invention can also be used to analyze and/or evaluate any networked physical infrastructure system (e.g., how to systematically divert traffic during evacuations with less interruptions, how to ensure water supply with minimal interruptions, etc.).

ABC improves the life cycle cost, reduces construction time, results in higher quality of elements, and can create impacts on the road network carrying regular traffic. Problems may occur during major natural extreme events (e.g., hurricane, wildfire). As such, assessment of network positions or credentials of bridges based on their topography or connectivity can be done to prioritize or stage ABC activities. Embodiments can use GIS modeling along with data about a physical network (e.g., a network of roads and/or bridges) to prioritize certain physical locations (e.g., roads and/or bridges) based on their network credentials. In particular, a systematic approach can be used to rank the topological credentials of physical locations bridges based on the connectivity of the network (i.e., the network according to network science principles). Significant changes in physical location ranking can occur when other variables are considered in the network topology (e.g., when vehicle traffic is introduced to the network topology). Embodiments provide new insights into ABC activities based on the topography of vulnerable bridges and monitoring system-wide impacts during a crisis (e.g., emergency evacuations during major hurricanes). Embodiments can benefit states, municipalities, and other transportation authorities by helping to prioritize risk based maintenance strategies and implement different ABC methods ensuring better quality and more efficient utilization of resources and time scheduling.

Identifying the vulnerable sections and cascading effects in a bridge network system can be quite challenging. Potential failure in a bridge network system is often overlooked, but the consequences can be catastrophic as it can adversely affect the mobility of people. Therefore, addressing the vulnerabilities is very complicated in large cities. Developing a framework for measuring resilience is a necessity, and a systematic approach to improving resiliency through vulnerability assessment is lacking in the related art. Embodiments of the subject invention provide systems and methods for assessing the vulnerability of a bridge network system and a strategy for improving its resiliency. With growing attention to risk-based inspection and maintenance of infrastructure, an accurate knowledge of the vulnerabilities and importance of interrelation among bridges in a network is crucial. The bridge network system in Florida, USA was used in the examples provided herein.

In order to support resilience planning for roadway networks a stage-wise decision framework can be used, concerning extenuation at pre-disaster scenario (Stage I), crisis reaction at post-disaster (Stage II), and retrieval in long-standing (Stage III). These decision measures are established to quantity the network's performance in terms of robustness, redundancy, and recovery, based on a derivation of the independent routes of a road network (see also Zhang et al., A Stage-wise Decision Framework for Transportation Network Resilience Planning, arXiv preprint arXiv: 1808.03850, 2018; which is hereby incorporated by reference herein in its entirety).

A programming model can incorporate mixed-integer method that provides a balanced portfolio of bridge construction techniques through network-level bridge priority processes. The project level can be carried out to optimize the option of accelerated construction methods, while the network level framework can be used to pick rapid replacement bridges based on their criticality to the network. The costs involved with replacement methods include direct costs for actual substituted bridge replacement and indirect costs incurred by network users during the repair cycle to illustrate the effects of various ABC methods (see Alipour et al., An Integrated Project to Enterprise-Level Decision-Making Framework for Prioritization of Accelerated Bridge Construction Final report from Bridge Engineering Center Institute for Transportation, Iowa State University, 2018; which is hereby incorporated by reference herein in its entirety). Hazardous impacts on regional network infrastructure can lead to network-wide consequences of disruptive occurrences, and the identification of considerably affected areas is significant to communicate the need of constructing the robust infrastructure as a key area in assessing transport network robustness at local level.

Bridges are the most vulnerable to earthquake damage in a transportation network (see Frangopol et al., Resilience as optimization criterion for the rehabilitation of bridges belonging to a transportation network subject to earthquake, Structures Congress-American Society of Civil Engineers Structural Engineering Institute, 2011; which is hereby incorporated by reference herein in its entirety). Improved disaster management can provide bridge restore sequences that attempt to optimize network durability and minimize the time needed to link critical sites (see Bocchini et al., Computational procedure for the assisted multi-phase resilience-oriented disaster management of transportation systems, Safety, reliability, risk, and life-cycle performance of structures and infrastructures, 581-588, 2013; which is hereby incorporated by reference herein in its entirety).

Several other related art attempts to examine the resiliency of a bridge network exist (see, e.g.; Karamlou et al., Optimal bridge restoration sequence for resilient transportation networks, In Structures congress (Vol. 2014, pp. 1437-1447), 2014; Banerjee et al., Multihazard resilience of highway bridges and bridge networks: a review, Structure and Infrastructure Engineering, 15(12), 1694-1714, 2019; Domaneschi et al., Earthquake-resilience-based control solutions for the extended benchmark cable-stayed bridge, Journal of Structural Engineering, 142(8), C4015009, 2015; Frangopol, Restoration of Bridge Networks after an Earthquake: Multicriteria Intervention Optimization, Earthquake Spectra: May 2012, Vol. 28, No. 2, pp. 426-455, 2012; Apostolopoulou et al., The Plaka Bridge in Epirus: An Evaluation of New Building Materials for Its Restoration, Heritage, 2(2), 1136-1159, 2019; Setunge et al., Vulnerability of road bridge infrastructure under extreme flood events. AFAC and Bushfire and Natural Hazards CRC Conference 2014, 2-5 Sep. 2014, Wellington, New Zealand, 2014; Weili Zhang, Resilience-based post-disaster recovery strategies for road-bridge networks. Structure and Infrastructure Engineering, 13:11, 1404-1413, DOI: 10.1080/15732479.2016.1271813, 2017; Tao et al., A Novel Markovian Framework for Optimum Maintenance of Deteriorating Bridges in Earthquake-prone Areas, 13th International Conference on Applications of Statistics and Probability in Civil Engineering (ICASP13), Seoul, South Korea, May 26-30, 2019; and Pritchard, 2011 to 2012 Queensland Floods and Cyclone Events: Lessons Learnt for Bridge Transport Infrastructure, Australian Journal of Structural Engineering, 14:2, 167-176, DOI: 10.7158/13287982.2013.11465130, 2013; all of which are hereby incorporated by reference herein in their entireties). However, none of these related art techniques focus on identifying the resilience of a bridge network from a network science perspective, and these related art methods therefore lack the advantages provided by embodiments of the subject invention.

The function termed "network resilience" refers to network resilience due to the removal of random nodes in a network, and depending on network topology, the degree of resilience to such vertex elimination varies across the network. Networks with least connected nodes experience less disturbance because these nodes lie on few pathways between others; while removing highly connected nodes from a huge real network may lead to serious disturbances. If nodes are removed from a network, the usual length of those paths will be increased and the communication between networking agents will be more difficult (see also Newman, The structure and function of complex networks, SIAM review 45(2), 167-256, 2003; which is hereby incorporated by reference herein in its entirety).

The degree of a node is the amount of direct connections or links to the other nodes ($deg_i$) in a graph. Degree can be explained in two sub definitions, in-degree and out-degree. In-degree is the amount of links directing in to the nodes ($in\_deg_i$), and out-degree is the amount of links directing out of the nodes ($out\_deg_i$) (see also Barrat et al., The architecture of complex weighted networks, Proceedings of the National Academy of Sciences of the United States of America 101(11), 3747-3752, 2004; which is hereby incorporated by reference herein in its entirety).

Betweenness centrality ($BC_i$) of nodes i is the summation of the segment of entire duos of smallest route that traverse to node i:

$$BC_i = \sum_{x,y \in V} \frac{\theta_{(x,y|i)}}{\theta_{(x,y)}} \quad (1)$$

where V=a number of nodes in G, $\theta_{(x,y)}$=number of smallest (x, y) routes, and $\theta_{(x,y|i)}$=amount of routes that traverse to different nodes j other than (x, y) (see also; Brandes, A faster algorithm for betweenness centrality, Journal of mathematical sociology 25(2), 163-177, 2001; Brandes, On variants of shortest-path betweenness centrality and their generic computation, Social Networks 30(2), 136-145, 2008; and Brandes et al., Centrality estimation in large networks, International Journal of Bifurcation and Chaos 17(07), 2303-2318, 2007; all of which are hereby incorporated by reference herein in their entireties).

The closeness centrality ($CC_i$) in the graph G of node i is the inverse of the summation of the spaces between smallest route from node i to all other (n−1) nodes:

$$CC_i = \frac{n-1}{\sum_{j=1}^{n-1} \theta_{(j,i)}} \quad (2)$$

In graph G, $\theta_{(j,i)}$=spaces between smallest routes from node j to node i and n=amount of entire nodes. Closeness centrality is standardized by the summation of least possible spaces of (n−1) nodes meanwhile the summation of the spaces relies on the quantity of nodes in the graph network. Higher centrality is defined by the higher values of closeness (see also Freeman, Centrality in social networks conceptual clarification. Social networks 1(3), 215-239, 1978; which is hereby incorporated by reference herein in its entirety).

Edge betweenness centrality measures the betweenness centrality for links or edges. Betweenness centrality of a link $e$ is the summation of the portion of entire duos smallest routes that traverse to $e$.

$$C_B(e) = \sum_{s,t \in V} \frac{\sigma(s,t|e)}{\sigma(s,t)} \quad (3)$$

where v=number of nodes, $\sigma(s, t)$=quantity of smallest (s, t)-routes, and $\sigma(s, t|e)$=amount of routes which traverse to link $e$ (see also; Newman, 2003, supra.; and Brandes, 2008, supra.).

Figure 2:
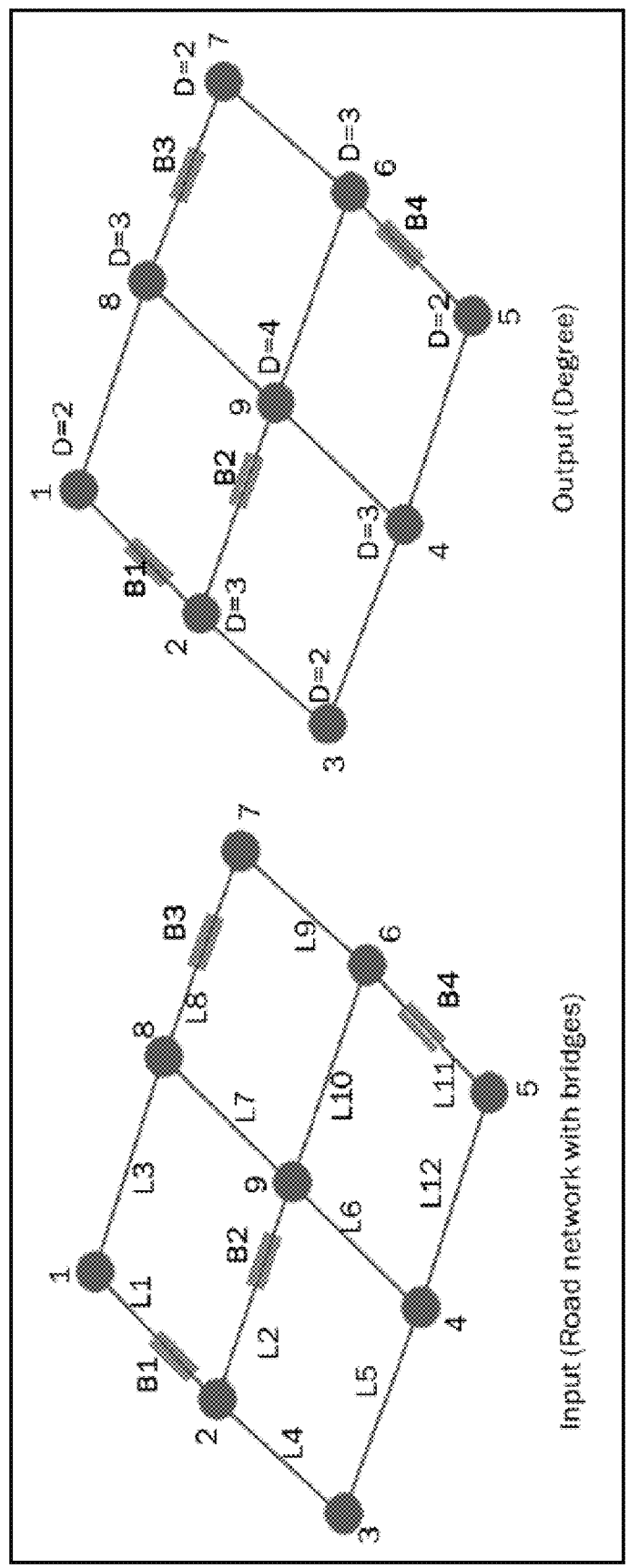
FIG. 2 shows a hypothetical bridge network analysis, showing node properties, according to an embodiment of the subject invention.

In order to understand the essence of bridge network analysis through different network parameters (degree, centrality) explained before, a hypothetical road-bridge network was created and considered as shown in FIG. 2. The road-bridge network is a 3×3 network with 9 nodes (roadway intersection), 12 links or roadways (L1-L12), and 4 bridges (B1-B4). The main objective of the analysis was to find the most influential bridge by analyzing node and link properties of this road network.

The higher the values of node properties (degree) and link properties (edge betweenness centrality and edge current-flow betweenness centrality) of the bridge, the more influential it is for the whole network. The road network in the left section of FIG. 2 shows the position of the bridges along with the roads and intersections (nodes), which was considered as an input layer for the network analysis. The road network in the right section of FIG. 2 shows the results for degree (number of roadway connections) of nodes, which shows that node 9 possessed the highest degree value and it was connected with bridge B2 through link L2.

Figure 3:
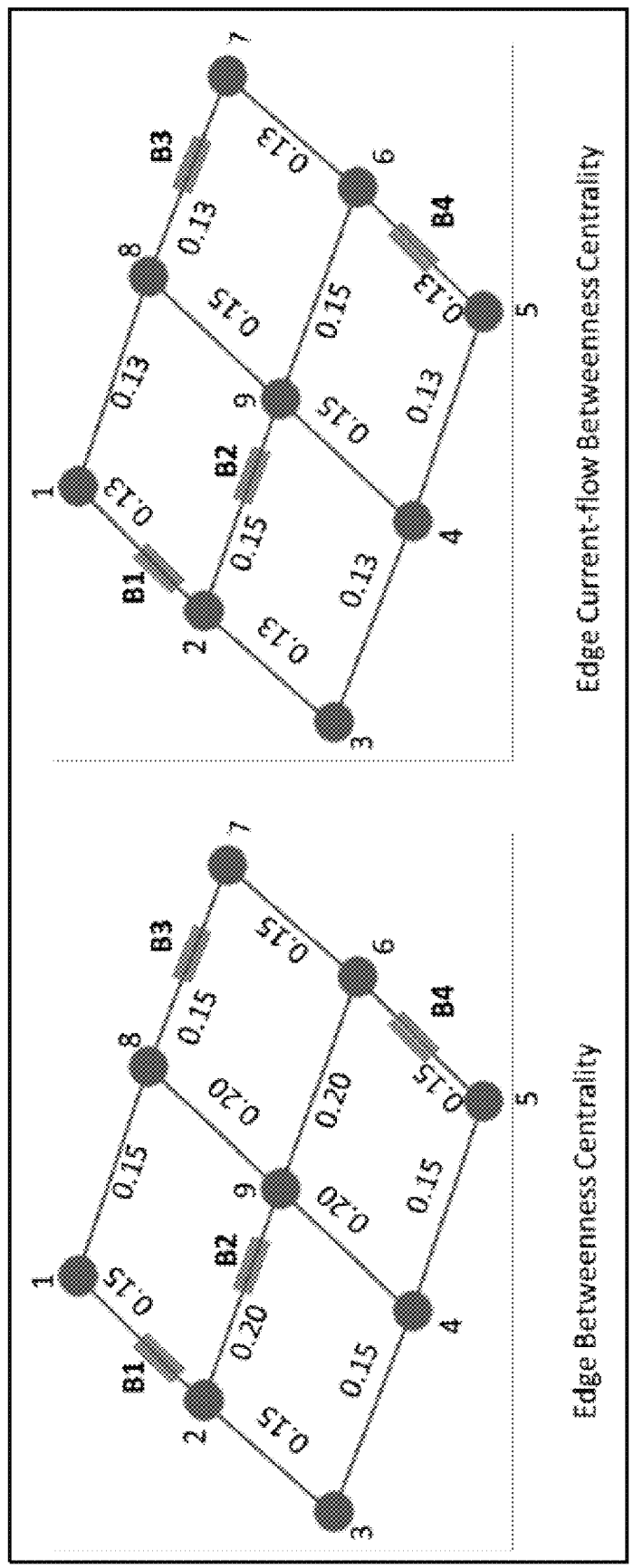
FIG. 3 shows a hypothetical bridge network analysis, showing link properties, according to an embodiment of the subject invention.

Referring to FIG. 3, the edge betweenness centrality (network in the left section of FIG. 3) and edge current-flow betweenness centrality (network in the right section of FIG. 3) results showed that the link L2, where bridge B2 is situated, had the highest values of 0.20 and 0.15, respectively. It indicated that the bridge B2 was the most influential bridge of the road network from network link property analysis, which was also true for network node property analysis as the bridge B2 is connected with the node of highest degree. Hence, it can be concluded that the bridge B2 is the most important bridge of this hypothetical road network.

Embodiments of the subject invention can analyze the vulnerability and resilience of a network of roads and/or bridges based on network science principles and/or graph theory. For example, bridge connectivity can be treated as a network to assess the interdependence between the connectivity of the system components and their functional behavior. These network links and nodes can be analyzed with respect to the resilience metrics to determine the critical components of a bridge network system that are more susceptible to external shocks. Once the vulnerabilities have been identified, priorities can be set to improve the different vulnerable sections of the network system. Also, a plan can be developed to improve the resiliency of some or all of the different components of the network system. Thus, network science principles can be applied to the analysis of bridge networks and/or ABC activities.

Embodiments can be implemented at different geographic scales. Also, GIS modeling can be used along with network data (e.g., bridge and/or road network data) to analyze and prioritize certain bridges and/or roads based on their network credentials. Embodiments can establish relationships between bridge and/or road topography and their functional behavior. Objectives of systems and methods of the subject invention can include: (a) analysis of the resiliency and/or vulnerability of networked systems (e.g., road, bridge, and/or road-bridge networked systems); (b) development of a framework for analysis of such networks and their topology with functional behavior; (c) incorporation of the analysis method in a user friendly tool for use by bridge owners and consultants for decision making on maintenance of the infrastructure; and (d) incorporation of complex network analysis with ABC options and features.

Embodiments of the subject invention provide new insights into ABC activities and scheduling based on the topography of vulnerable bridges and monitoring system-wide cascading effects. By applying network science principles, most important (higher degree and more central) bridges within the bridge network can be identified for both unweighted (considering only network connectivity) and weighted (considering additional factors, such as traffic volume, with network connectivity) network. More emphasis (e.g., for ABC and/or by policy makers) can be put on the maintenance, repair, retrofitting, and/or construction on the most influential/central bridges. This can facilitate recovery of bridge networks after an extreme event, thereby increasing and/or ensuring system resiliency. Similar context can be applied to new ABC activities by prioritizing the new construction sites. Embodiments provide approaches and tools that states, municipalities, and other transportation authorities can use to select the proper actions (i.e., optimal sequencing) for repair and replacement of exiting bridges by implementing ABC methods of choice and on a risk-based maintenance strategy.

Systems and methods of embodiments of the subject invention can identify central and/or influential bridges, and such systems and methods can also be used in the context of new bridge construction (e.g., according to an ABC decision making guideline) (see also Mehrabi et al., Available ABC Bridge Systems For Short Span Bridges—Course Module, Quarterly Progress Report, For the period ending Nov. 30, 2019, ABC_UTC, 2019; which is hereby incorporated by reference herein in its entirety. Because bridges are a part of road networks, the most influential road segments can also be found by following a similar network analysis. After identifying the central roadway segments that could be connected by bridges, the construction of these new bridges can be prioritized over other potential new bridge construction. By doing so, the bridges that connect most central roadways can reduce the surrounding roadway system travel time, vehicle delay for defined origin destination, and time-cost value of the construction, while also improving the resiliency of the road network.

ABC is an emerging alternative to traditional construction as ABC minimizes the life-cycle cost, construction time, and several other problems related to construction methods, while resulting in better quality of work. Embodiments of the subject invention provide systems, methods, and frameworks for identifying network credentials of bridges (e.g., rank of relative importance) by combining GIS modeling with network science principles (e.g., centrality of bridges) to improve the resilience of road-bridge networked systems. The approach can provide a list of bridges in the road network based on their centrality values (e.g., from most central to least central or vice versa) that can be adopted at different scales (i.e., different network size). The examples provided herein demonstrated how such topological credentials can change at different scales, as well as when weights are introduced to the topology such as traffic volumes to establish relative importance of bridges in more of a global perspective rather than a localized one. Embodiments can allow practitioners and other stakeholders performing ABC activities to decide on and/or prioritize which bridge(s) should be inspected, maintained, or constructed first based on the position of the bridges in a network setting. Prioritizing maintenance activities or new construction work can be done while taking the bigger picture into consideration.

Embodiments of the subject invention can also be extended towards responding to any emergency evacuation scenario by ensuring more efficient route guidance to evacuees and minimizing, inhibiting, and/or preventing possible gridlocks due to ABC activities. For example, people in Miami Beach, USA tend to take Venetian and MacArthur Causeways as they evacuate inland. Such preferences can be diverted if the vulnerability of these bridges is assessed ahead of time to ensure more credible system performance. In addition, the network metrics such as centrality changes based on the scale of the network as shown in FIGS. 18 and 19. Hence, deciding an appropriate network scale can be the first step towards identifying the influential bridges in a given road network. Embodiments can also support traffic simulation based testing and/or implementations to quantify the effects on travel time based on network credentials. Previous studies showed how to prioritize bridges based on mixed-integer programming; however, the network variables utilized in embodiments can add to formulations using mixed-integer programming, thereby leading to deduction of more efficient solutions (see also Alipour, 2018, supra.).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

The vulnerability and resilience of the Florida bridge network was analyzed based on network science principles and graph theory. For example, the bridge connectivity was treated as a network to assess the interdependence between the connectivity of the system components and their functional behavior. These network links and nodes were analyzed with respect to the resilience metrics to determine the critical components of a bridge network system that are more susceptible to external shocks. Once the vulnerabilities were identified, priorities were set to improve the different vulnerable sections of the bridge network system. A plan was developed to improve the resiliency of all the different components of the bridge network systems. The experiments confirmed that network science principles can successfully be applied to the study of bridge networks and ABC activities.

Examples focused on a coordinated and extensive network of experiments at different geographic scales to apply complex network science principles to the study of Florida bridge networks and ABC related activities. Geographic information system (GIS) modeling was used along with Florida bridge and road network data to run network experiments and prioritize certain bridges based on their network credentials. The examples, according to embodiments of the subject invention, established relationships between bridge topography and the functional behavior of the bridges. Some objectives of the examples included: (a) investigation on the resiliency and vulnerability of road-bridge networked systems; (b) development of a framework for analysis of such networks and their topology with functional behavior; (c) incorporation of the analysis method in a user friendly tool for use by bridge owners and consultants for decision making on maintenance of the infrastructure; and (d) incorporation of complex network analysis with ABC options and features.

The examples provide new insights into ABC activities and scheduling based on the topography of vulnerable bridges and monitoring of system-wide cascading effects. By applying network science principles, most important (higher degree and more central) bridges among a bridge network can be identified for both unweighted (considering only network connectivity) and weighted (considering both traffic volume with network connectivity) networks. It can be determined on which bridges to put more emphasis (e.g., maintenance, retrofitting), and this can facilitate recovery of bridge networks after an extreme event, thereby ensuring resiliency. Similar context can be applied to new ABC activities by prioritizing the new construction sites. The examples have demonstrated an approach and tool that states, municipalities, and other transportation authorities can use to select the proper actions for repair and replacement of existing bridges by implementing ABC methods of choice and on a risk-based maintenance strategy.

The Florida road network shape file was obtained from the Transportation Data and Analytics/GIS section of the Florida Department of Transportation (FDOT) website (FDOT Transportation Data and Analytics/GIS section, www.fdot.gov/statistics/gis/default.shtm; which is hereby incorporated by reference herein in its entirety). The Florida bridge location shape file was also obtained from the same FDOT website. Then, the Florida road-bridge network was extracted from the Florida road-bridge shape files using GIS software.

The shape file for the road network of Florida includes all the freeways, highways, and arterials of the state. In addition, the Florida bridge location shape file covers all the respective bridges on these highways, freeways, and arterials. The Florida road-bridge network analyses, along with these shape files, were performed in four scales: (1) Key West road-bridge network; (2) Miami Beach road-bridge network; (3) Miami-Dade County road-bridge network; and (4) Florida road-bridge network.

The Florida road network shape file is a polyline shape file and contains authentic information about the roadways. All the information is stored in a database that is accessible through the Attribute Table. From the shape file database, it was observed that the roadway names are available according to the road location and local place. Also, the roadway numbers assigned by FDOT are also available along with the county name, ZIP code, and roadway direction (e.g., eastbound, westbound, southbound, northbound).

The bridge location shape file for the Florida is also a polyline shape file that provides some essential information for the bridge network analysis. The attribute Table of the shape file includes the specific roadway numbers, through which the bridges can be specified along with the roadways. Also, the structure number of each bridge assigned by FDOT, information about FDOT districts, county names, and the length of roadway segments are also available.

The most important information for the road and bridge network analysis is the specific geolocations (coordinates) of the starting point and end point of each roadway segment, which is available with the length of these segments. From the attribute Tables, it was found that there are approximately 18,550 roadway segment and 15,550 roadway segment intersection data points in the Florida road shape file. Then, the route number (for an example the name of 8th street is US 41 according to the route number), number of lanes, and Average Annual Daily Traffic (AADT) counts are also obtainable from the attribute Tables of the shape files.

In order to identify the most influential bridges of the road-bridge networks, Closeness Centrality (node property) and Edge Betweenness Centrality (link property) were considered as the network parameters. The road shape file was converted to a network readable file by using NetworkX, a library of python programming language. NetworkX is developed for the formation, management, and training of the configuration, dynamics, and purposes of multifaceted networks (see NetworkX—Software for complex networks, networkx.github.io/; and Mortula et al., Improving Resiliency of Water Supply System in Arid Regions: Integrating Centrality and Hydraulic Vulnerability, Journal of Management in Engineering, 2020; both of which are hereby incorporated by reference herein in their entireties). The key steps involved in network analysis of the shape files were as follows. (1) At first, python programming language was used to convert the road shape file to a network readable file for network analysis. (2) NetworkX library in python language was used to convert the shape files. (3) The NetworkX library converted the geolocation information of the road-bridge network shape file to a network graph, which contained the road starting and end point information with specific labeling. (4) This network graph was internally created within the python code; it was not necessary to import the network graph as NetworkX library can directly analyze the graph. (5) Then, network analysis was performed on the road shape files for different network parameters. (6) The output files from the road shape files network analyses and bridge shape files were mapped according to the common road names to identify the influential bridges.

Example 1—Key West Road-Bridge Network Analyses

Unweighted graph analysis shows the effect of road-bridge network connectivity on different scales of the study area. From the Key West road shape file, 50 roadway segments and 37 roadway segment intersections were found. After performing the Closeness Centrality analysis and mapping with bridges, 19 specific bridge locations were found with a centrality value. Referring to FIG. 10, all of the Key West bridge location Closeness Centrality values are listed in order from highest to lowest. Then, the network analysis was performed for the link property by calculating Edge Betweenness Centrality. Twenty-five roadway segments with bridges were found with centrality values after mapping with bridge shape file. Referring to FIG. 11, all the Key West bridge segment Edge Betweenness Centrality values are listed from in order from highest to lowest.

Figure 4:
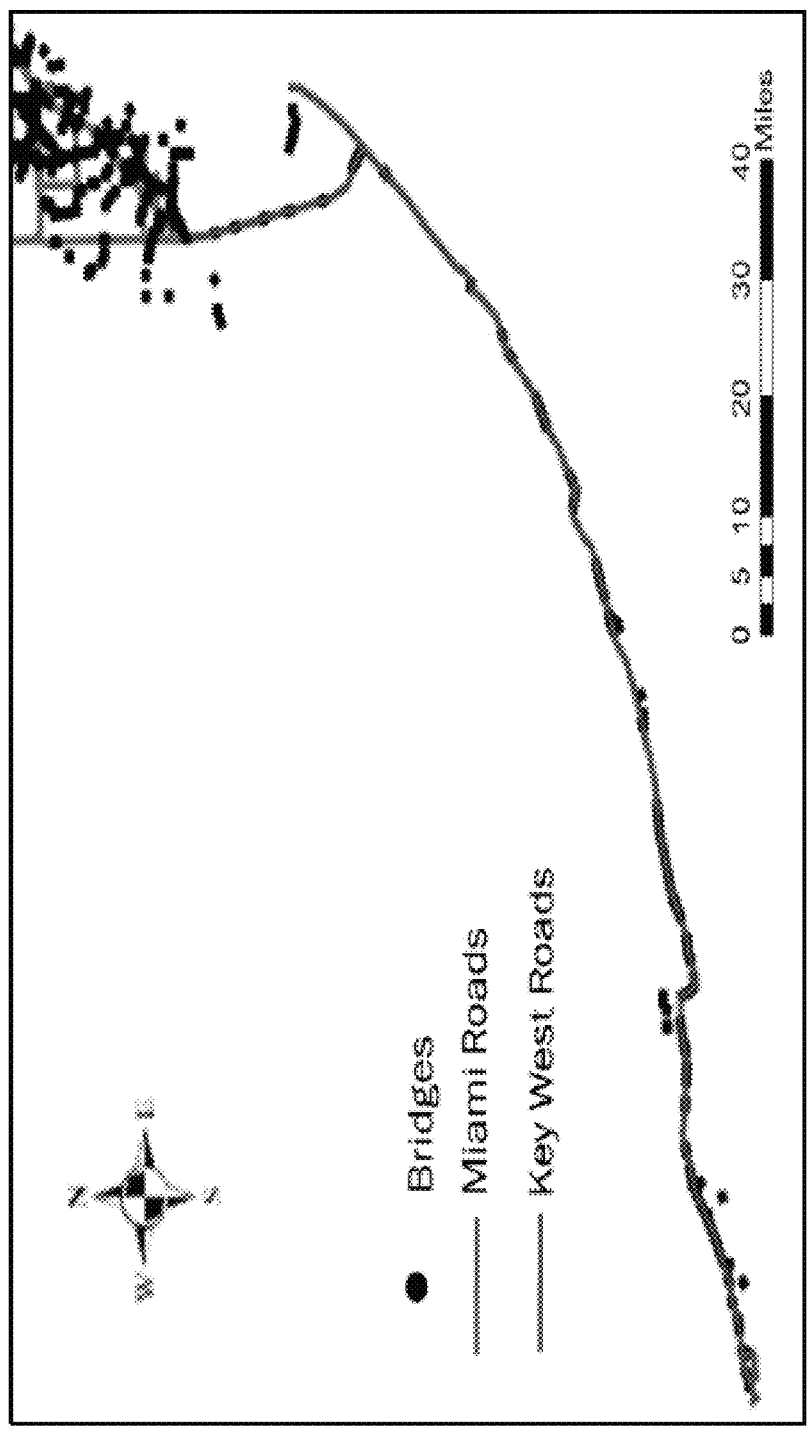
FIG. 4 shows a map of the Key West road-bridge network. The (blue) solid lines near the top of the map are for Miami roads; the (red) solid lines in the bottom 80% or so of the map are for the Key West roads; and the (black) dots are for bridges.
Figure 5:
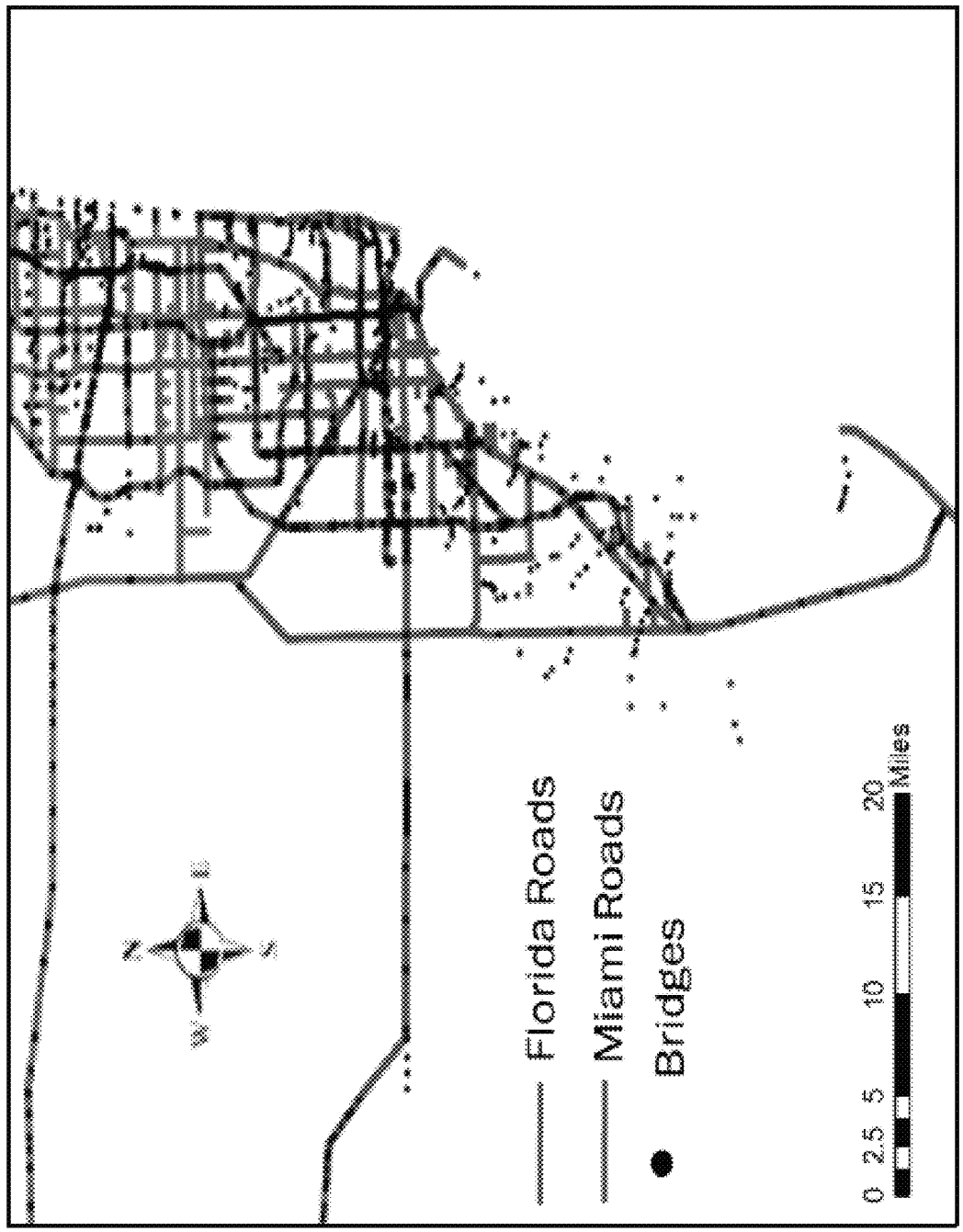
FIG. 5 shows a map of the Miami-Dade County road-bridge network. The (blue) solid lines near the top of the map are for Florida roads; the (red) solid lines in the bottom 80% or so of the map are for the Miami roads; and the (black) dots are for bridges.

Weighted graph analysis reflects the effect of different weights (e.g., traffic count, volume, delay, etc.) applied on the nodes and links along with the connectivity of the network. In the tests, weighted analysis was performed only for links or roadways as the network parameter for nodes (closeness centrality) does not consider weights. Average Annual Daily Traffic (AADT), which is calculated by counting the total volume of vehicles of a road for a year divided by 365 days, was considered as weight on the roadways (see also Arafat, Utilizing an Analytical Hierarchy Process with Stochastic Return On Investment to Justify Connected Vehicle-Based Deployment Decisions, Transportation Research Record 2674(9), 462-472, 2020; which is hereby incorporated by reference herein in its entirety). For the Key West road-bridge network, weighted analysis did not show any differences in Edge Betweenness Centrality values, and the results showed a similar output as shown in FIG. 11. The reason behind this was the network topology and characteristics of the Key West road-bridge network as it is actually a long stretch at the southernmost part of the State of Florida as shown in FIG. 4. As such, networks with more complex topology (i.e., grids, triangles) are likely to show more convincing changes in network credentials, which is not applicable for the Key West network. Such effects are presented in the following sections that include analyses of Miami-Dade County and Florida networks.

Example 2—Miami-Dade County Road-Bridge Network Analyses

From the Miami-Dade road shape file, 2199 roadway segments and 1960 roadway segment intersections were found. After performing the Closeness Centrality analysis and mapping with bridges, 137 specific bridge locations were found with a centrality value. The specific locations of the 20 most central bridges of Miami-Dade County according to the node property are listed in FIG. 12. Then, the network analysis was performed for the link property by calculating Edge Betweenness Centrality. One hundred and sixty-eight roadway segments with bridges were found with centrality values after mapping with the bridge shape file. The most 50 central bridge segments of Miami-Dade County according to the link property are listed FIGS. 13 and 14.

Because one of the prime objectives was to examine the effect on traffic due to ABC-related activities, AADT was considered as a weight on the roadways of Miami-Dade County. From the weighted Edge Betweenness Centrality results listed in FIGS. 13 and 14, it can be seen that traffic volume influenced the network parameters significantly as the ranking of most central bridges changed after considering the impact of traffic on road-bridge network. For example, a bridge at Collins Avenue previously ranked as the $10^{th}$-most central bridge from the unweighted analysis, but with the effect of traffic its ranking changed to the 19th-most central bridge. Referring again to FIGS. 13 and 14, this type of change in ranking of central bridges is found multiple times where some of the bridges had their ranking increased and some decreased.

Figure 6:
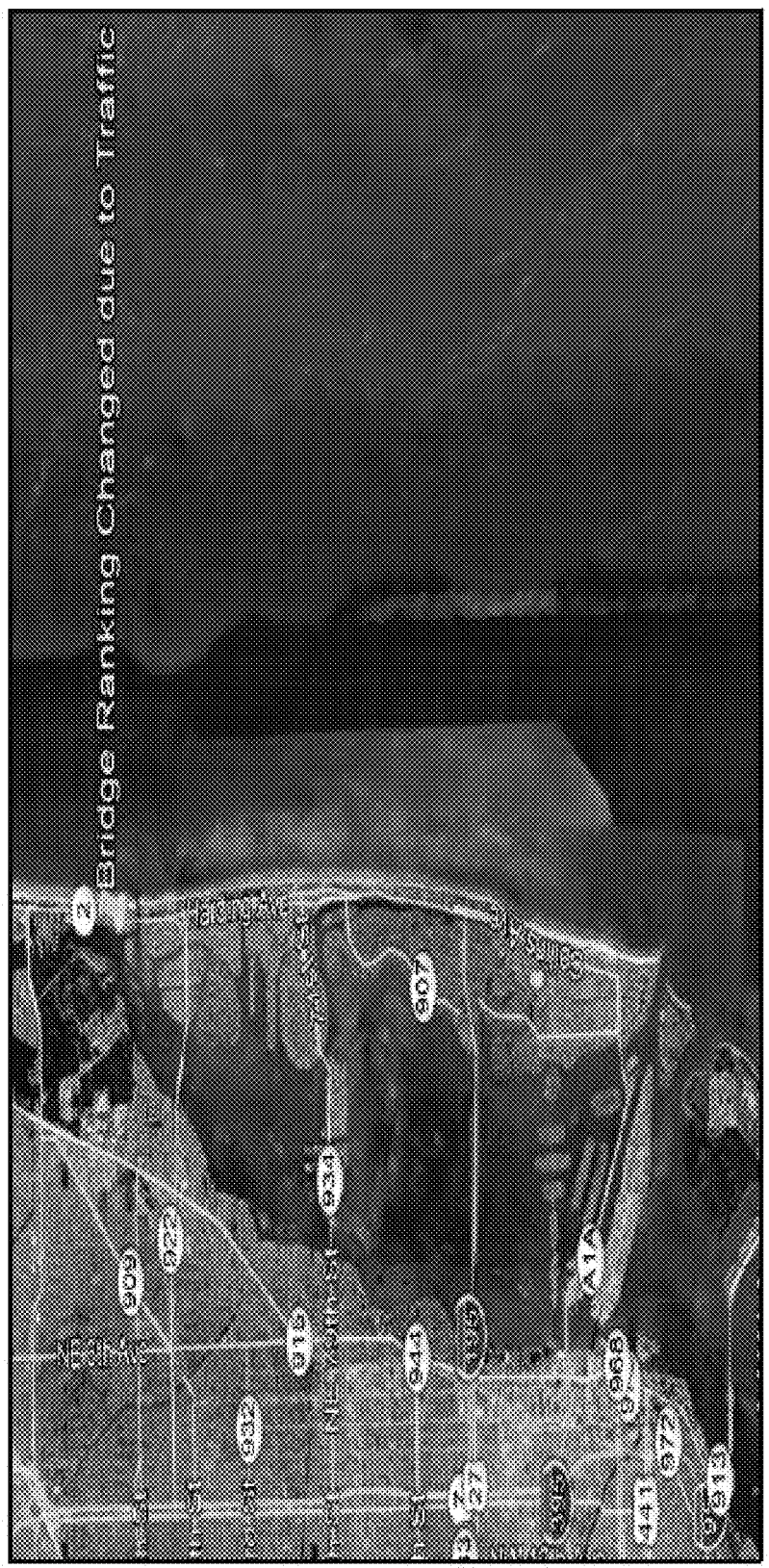
FIG. 6 shows an image of a map illustrating change in ranking of a central bridge of Miami-Dade County due to traffic.
Figure 7:
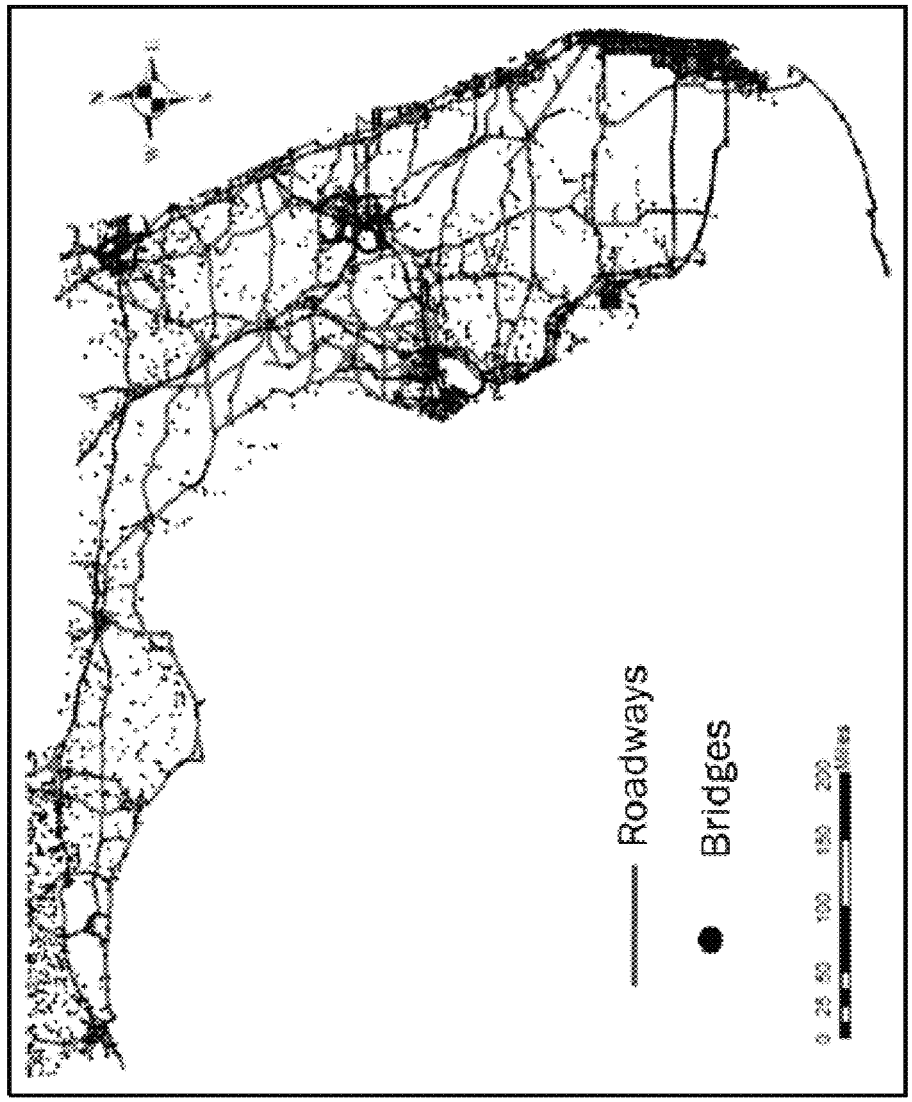
FIG. 7 shows a map of the Florida road-bridge network. The (blue) solid lines are for roadways; and the (black) dots are for bridges.

The bridges previously (unweighted analysis) ranked as the 24th-most (West Flagler Street) and 26th-most (Sunset Drive) central bridges changed to the 57th-most and 45th-most central bridges, respectively, after considering the effect of traffic on the corresponding roadways. On the other hand, the bridges ranked as the 46th-most (Caribbean Boulevard) and 47th-most (Marlin Road) central bridges from the unweighted analysis changed to the 23rd-most and 25th-most central bridges, respectively, for weighted graph. Also, the centrality values of the top nine ranked bridges did not show any changes from the unweighted analysis, and the bridges ranked from 10 to 18 showed only minor changes in the weighted analysis. The change in bridge ranking due to traffic is visualized in FIG. 6, where the geolocation of the bridge ranked as 22 from FIGS. 13 and 14 (previously ranked as 20 in the unweighted analysis) is highlighted.

The Miami Beach network shape file (which is a subset of the Miami-Dade County shape file) included 745 roadway segments and 678 roadway segment intersections. After performing the Closeness Centrality analysis and mapping with bridges, 107 specific bridge locations were found with a centrality value. From Edge Betweenness Centrality analysis, 134 roadway segments with bridges were found with centrality values after mapping with the bridge shape file. As the number of specific bridge locations and bridge segments of Miami Beach and Miami-Dade County are very close, the results of the Miami Beach network were only considered for scaling effect discussion.

Example 3—Florida Road-Bridge Network Analyses

From the Florida road shape file, 18,462 roadway segments and 15,417 roadway segment intersections were found. After performing the Closeness Centrality analysis and mapping with bridges, 2,444 specific bridge locations were found with a centrality value. The specific locations of the 20 most central bridges of Florida according to node property are listed in FIG. 15. Then, the network analysis was performed for the link property by calculating Edge Betweenness Centrality. Three thousand, two hundred, and fifty-two roadway segment with bridges were found with centrality values after mapping with the bridge shape file. The 50 most central bridge segments of Florida according to the link property are listed in FIGS. 16 and 17.

As weighted analysis is not applicable for Closeness Centrality (node property) network parameter, Weighted Edge Betweenness Centrality values (link property) were calculated for the Florida road-bridge network. Similar to the Miami-Dade County network, noteworthy changes in bridge ranking due to traffic were also observed and reported in FIGS. 16 and 17, where increases in bridge ranking due to traffic and decreases can be seen. For example, bridges ranking 10, 19, 42, and 44 in the unweighted network improved to 6, 11, 14, and 15, respectively, after considering traffic as a weight. The bridges ranked as 2, 5, 6, 29, 41, and 43 experienced a huge decrease in ranking due to traffic in the weighted network analysis. These results and changes in bridge ranking clearly showed the impact of traffic volume on the road-bridge network along with the network connectivity.

Example 4—Scaling Effects

Figure 8A:
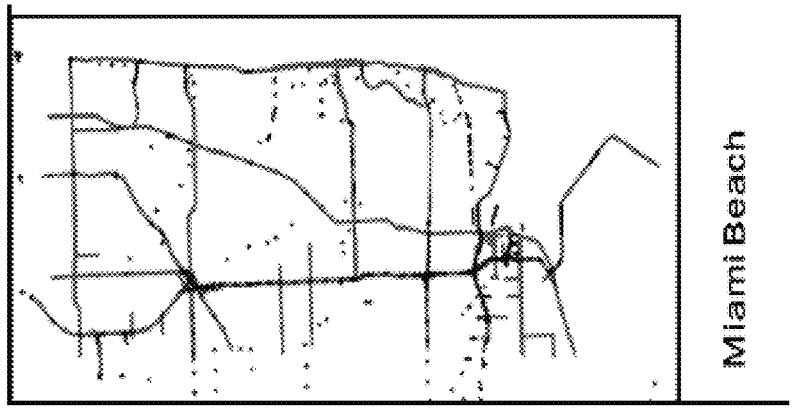
FIG. 8(a) shows a map of the Miami Beach road-bridge network. The (red) solid lines are for roadways; and the (black) dots are for bridges.
Figure 8D:
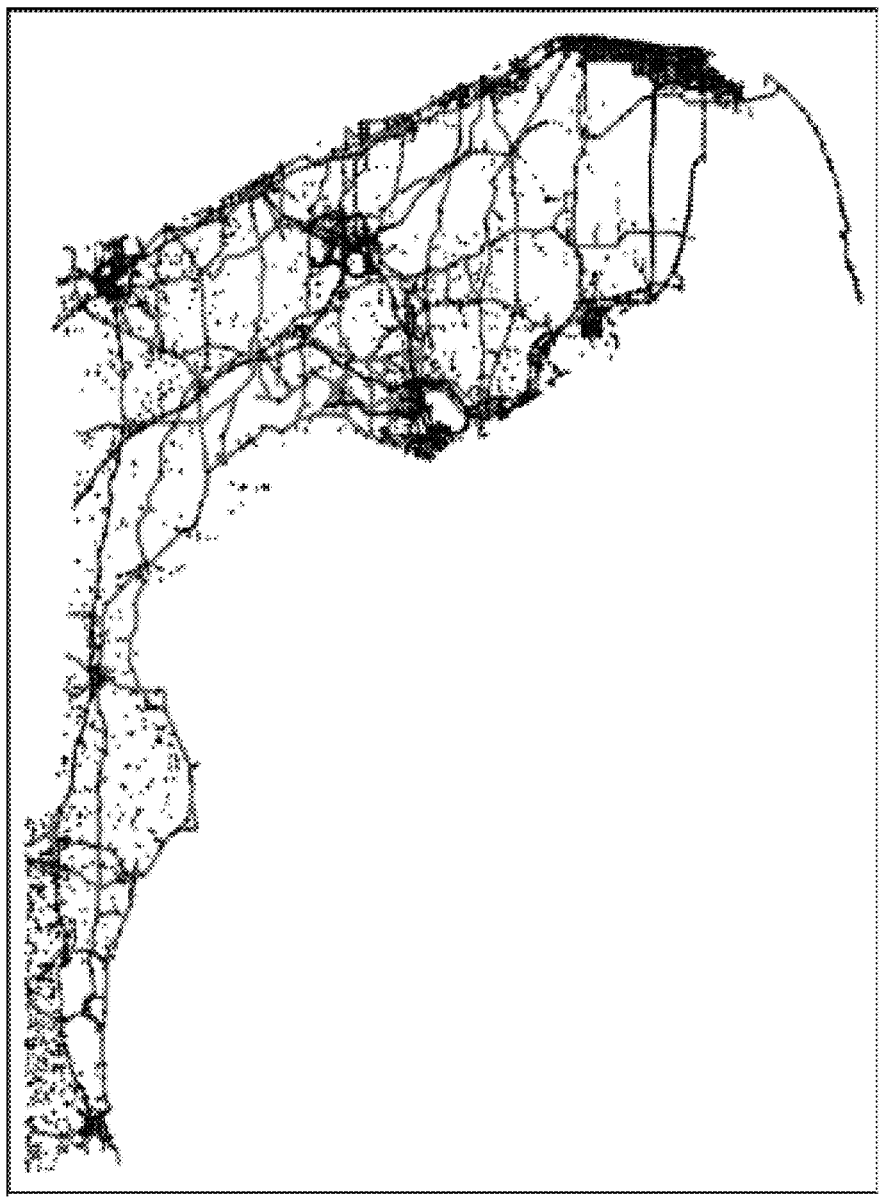
FIG. 8(d) shows a map of the Florida road-bridge network. The (blue) solid lines are for roadways; and the (black) dots are for bridges.

Because Miami Beach and Miami-Dade County are a subset of the Florida network, all the bridge points and bridge segments of Miami Beach and Miami-Dade County are found in the Florida network analysis, but with different centrality values. This happens because of the scaling effect of the networks. The same bridge shows different centrality values for different scales of the network. The smaller the network size, the higher the centrality values of a bridge. In FIG. 18, network scaling effects are shown for the node property (Closeness Centrality) along with the respective bridge rankings of these networks, which clearly depicts higher centrality values for in the Miami Beach and Miami-Dade County networks than in the Florida network for the same bridge location. Similarly, for the link property (Edge Betweenness Centrality) of the network, the scaling effect is also illustrated in FIG. 19 where the centrality values of bridge segments in the Florida network are smaller than in the Miami Beach and Miami-Dade County networks. In both cases, the Miami Beach network is considered as the base network for the comparison of centrality values and bridge rankings among the three different scales. FIGS. 8(*a*)-8(*d*) show the different scales used for the network analyses to explain the scaling effect.

Figure 9:
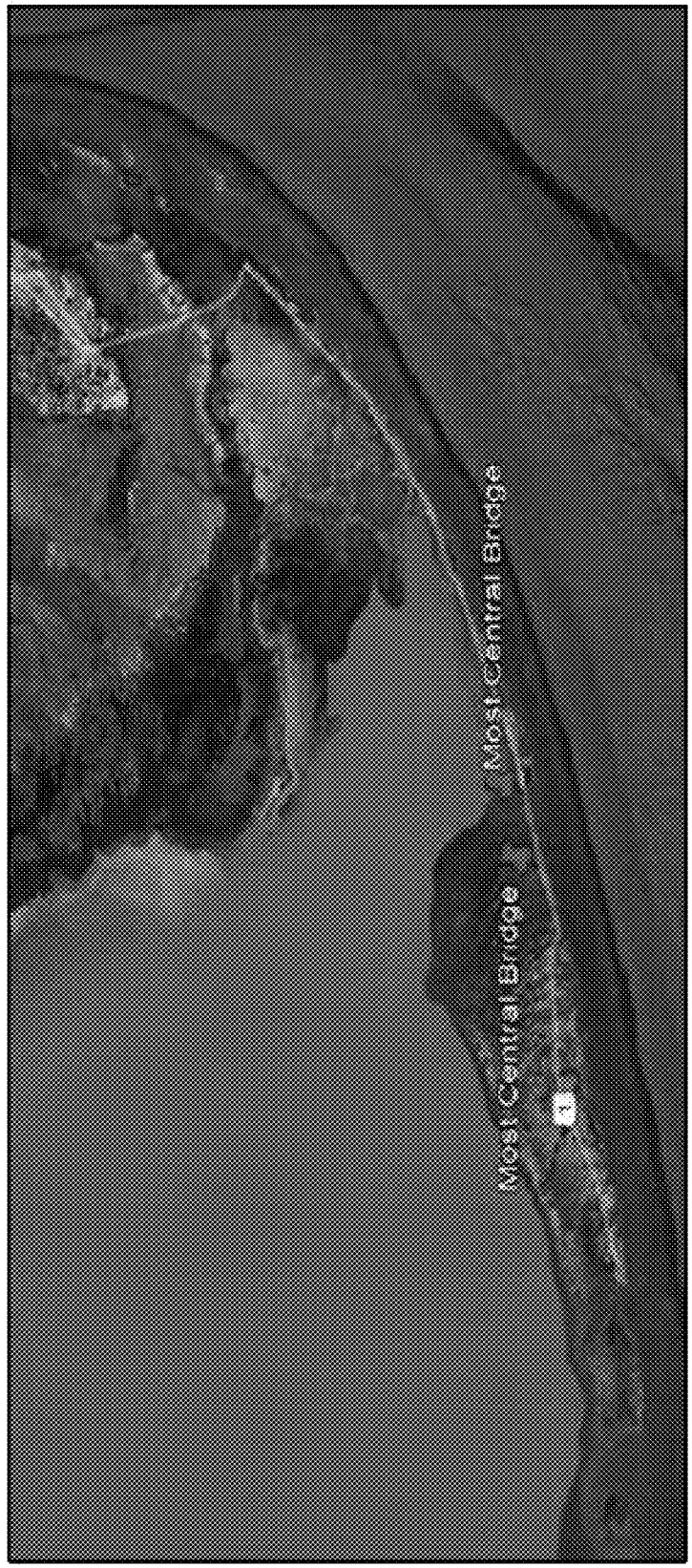
FIG. 9 shows an image of a map illustrating the two central-most bridges of Key West.

A main objective of the analyses performed in the examples was to analyze the road-bridge networks from a topographical or global point of view to identify the vulnerable bridges of the respective road networks through network science principles to improve the resiliency of the network. In order to explain the scaling effects, the Florida road-bridge network was considered and analyzed at three different scales (i.e., City of Miami Beach, Miami-Dade County, and the State of Florida). All the network analysis results represent the most influential, vulnerable, and central bridges in order for both weighted and unweighted networks. In order to quantify this phenomenon, node level property and link level property of the network were measured by Closeness Centrality and Edge Betweenness Centrality. FIGS. 10-17 illustrate the rankings of most important bridges of the respective unweighted/weighted networks from high to low. For example, FIG. 9 shows the two most central bridges of Key West, and FIGS. 13, 14, 16, and 17 show the effect of traffic along with the network connectivity on bridge ranking as well as the changes in priority due to traffic volume (see also FIG. 6). In order to explain the scaling effects of the Key West network, larger scales such as Monroe County and/or the State of Florida could be considered.

In order to prioritize the bridge construction or maintenance work, Closeness Centrality values (FIGS. 10, 12, and 15) should be considered for specific bridge location (node) analysis, such as road-bridge intersecting point or bridge segment joints. In addition, Edge Betweenness Centrality (FIGS. 11, 13, 14, 16, and 17) should be considered while bridge segments are the point of interest for an unweighted network. In order to consider the effect of traffic along with network credentials on bridge segments, ranking of bridges as shown in FIGS. 13, 14, 16, and 17 should be taken in consideration.

Typically, the bridges of the United States are inspected for regular maintenance purposes every two years. Sometimes due to time and budget constraints, inspection of all the bridges may not be possible in a timely manner, leading to maintenance work delays. As a result, the bridges that have more impact or influence on the road network can remain under-maintained and/or under-examined. This impact means if these bridges are removed from the road network, most of the routes of the network would be affected, which would result in increased travel time and vehicle delay, thereby deceasing the resiliency of the road network. By having the list of influential bridges, ABC can approach systematically while performing the maintenance of the existing bridges. As an example, Roosevelt Bridge in Florida was shut down in June 2020 due to a major crack formation. In previous regular inspections this crack formation might have been overlooked. The closure of the bridge had a large effect on the surrounding traffic network, which resulted in higher travel time, more delays, and higher repair costs. If the concerned authority knew ahead of time that it is one of the most central bridges of the surrounding road network, they could have avoided this situation by prioritizing the maintenance work of this bridge.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for analyzing a physical infrastructure, the system comprising:
   a processor; and
   a machine-readable medium in operable communication with the processor and having instructions stored thereon that, when executed by the processor, perform the following steps:
   a) receiving, by the processor, first data regarding physical components within the physical infrastructure, the first data comprising geographic information system (GIS) coordinates of the respective physical components, and the physical components comprising bridges and roads;

b) converting, by the processor, the first data to a network graph;

c) performing, by the processor, a network analysis on the network graph to determine a ranking of the physical components within the physical infrastructure based on nodes with a highest degree; and d) utilizing, by a user of the system, the ranking to determine an optimal sequencing plan for the physical components, the plan being a plan for at least one of operation, maintenance, repair, and construction, the plan being an Accelerated Bridge Construction (ABC) plan for a top-ranked bridge of the physical components, the performing of the network analysis on the network graph comprising performing at least one of: a closeness centrality analysis on a node property of the network graph; and an edge betweenness centrality analysis on a link property of the network graph, the closeness centrality analysis comprising determining a closeness centrality ($CC_i$) in the network graph (G) as follows $$CC_i = \frac{n-1}{\sum_{j=1}^{n-1} \theta_{(j,i)}},$$

where i is a first node, n is a total quantity of nodes, j is a second node, and $\theta_{(j,i)}$ is spaces between shortest routes from the second node to the first node, and the edge betweenness centrality analysis comprising determining a betweenness centrality ($C_B$) on a link (e) as follows $$C_B(e) = \sum_{s,t \in V} \frac{\sigma(s,t|e)}{\sigma(s,t)},$$

where v is a number of nodes, $\sigma(s,t)$ is a quantity of smallest routes and $\sigma(s, t|e)$ is a total amount of routes that traverse the link (e).

2. The system according to claim 1, the ranking comprising at least one of a ranking of the physical components with the highest closeness centrality ($CC_i$) and a ranking of the physical components with the highest betweenness centrality ($C_B$).

3. The system according to claim 1, the performing of the network analysis comprising performing the edge betweenness centrality analysis using at least one weighting variable.

4. The system according to claim 3, the at least one weighting variable comprising a traffic count of each physical component.

5. The system according to claim 3,
the at least one weighting variable comprising at least one of a traffic count, a traffic volume, and a traffic delay.

6. The system according to claim 3, the ranking comprising a ranking of the physical components based on the edge betweenness centrality analysis using the at least one weighting variable.

7. A method for analyzing a physical infrastructure, the method comprising:

a) receiving, by a processor, first data regarding physical components within the physical infrastructure, the first data comprising geographic information system (GIS) coordinates of the respective physical components, and the physical components comprising bridges and roads;

b) converting, by the processor, the first data to a network graph; and c) performing, by the processor, a network analysis on the network graph to determine a ranking of the physical components within the physical infrastructure based on nodes with a highest degree; and d) utilizing, by a user, the ranking to determine an optimal sequencing plan for the physical components, the plan being a plan for at least one of operation, maintenance, repair, and construction, the plan being an Accelerated Bridge Construction (ABC) plan for a top-ranked bridge of the physical components;

e) executing, by the user, the ABC plan to repair or construct the top-ranked bridge, the performing of the network analysis on the network graph comprising performing at least one of: a closeness centrality analysis on a node property of the network graph; and an edge betweenness centrality analysis on a link property of the network graph, the closeness centrality analysis comprising determining a closeness centrality ($CC_i$) in the network graph (G) as follows $$CC_i = \frac{n-1}{\sum_{j=1}^{n-1} \theta_{(j,i)}},$$

where i is a first node, n is a total quantity of nodes, j is a second node, and $\theta_{(j,i)}$ is spaces between shortest routes from the second node to the first node, and the edge betweenness centrality analysis comprising determining a betweenness centrality ($C_B$) on a link (e) as follows $$C_B(e) = \sum_{s,t \in V} \frac{\sigma(s,t|e)}{\sigma(s,t)},$$

where v is a number of nodes, $\sigma(s,t)$ is a quantity of smallest routes and $\sigma(s, t|e)$ is a total amount of routes that traverse the link (e).

8. The method according to claim 7, the performing of the network analysis comprising performing the edge betweenness centrality analysis using at least one weighting variable.

9. The method according to claim 8,
the at least one weighting variable comprising at least one of a traffic count, a traffic volume, and a traffic delay.

10. The method according to claim 8, the ranking comprising a ranking of the physical components based on the edge betweenness centrality analysis using the at least one weighting variable.

11. A system for analyzing a physical infrastructure, the system comprising:

a processor; and a machine-readable medium in operable communication with the processor and having instructions stored thereon that, when executed by the processor, perform the following steps:

a) receiving, by the processor, first data regarding physical components within the physical infrastructure, the first data comprising geographic information system (GIS) coordinates of the respective physical components;

b) converting, by the processor, the first data to a network graph;
c) performing, by the processor, a network analysis on the network graph to determine a ranking of the physical components within the physical infrastructure based on nodes with a highest degree; and
d) utilizing, by a user of the system, the ranking to determine a plan for the physical components, the plan being a plan for at least one of maintenance, repair, and construction, the physical components comprising bridges and roads, the plan being an Accelerated Bridge Construction (ABC) plan, the performing of the network analysis on the network graph comprising performing at least one of: a closeness centrality analysis on a node property of the network graph; and an edge between centrality analysis on a link property of the network graph, the closeness centrality analysis comprising determining a closeness centrality ($CC_i$) in the network graph (G) as follows $$CC_i = \frac{n-1}{\sum_{j=1}^{n-1} \theta_{(j,i)}},$$

where i is a first node, n is a total quantity of nodes, j is a second node, and $\theta_{(j,i)}$ is spaces between shortest routes from the second node to the first node, and the edge betweenness centrality analysis comprising determining a betweenness centrality ($C_B$) on a link (e) as follows $$C_B(e) = \sum_{s,t \in V} \frac{\sigma(s,t|e)}{\sigma(s,t)},$$

where v is a number of nodes, $\sigma(s,t)$ is a quantity of smallest routes and $\sigma(s, t|e)$ is a total amount of routes that traverse the link (e), the performing of the network analysis on the network graph comprising performing: a closeness centrality analysis on a node property of the network graph; and an edge betweenness centrality analysis on a link property of the network graph, the edge betweenness centrality analysis comprising using at least one weighting variable, the ranking comprising at least one of a ranking of the physical components with the highest closeness centrality ($CC_i$) and a ranking of the physical components with the highest betweenness centrality ($C_B$), and the at least one weighting variable comprising at least one of a traffic count, a traffic volume, and a traffic delay.

\* \* \* \* \*